US008773716B2

(12) United States Patent
Horita

(10) Patent No.: US 8,773,716 B2
(45) Date of Patent: Jul. 8, 2014

(54) PRINT COLOR PREDICTING APPARATUS, PRINT COLOR PREDICTING METHOD, AND RECORDING MEDIUM

(75) Inventor: Shuhei Horita, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 7 days.

(21) Appl. No.: 13/285,770

(22) Filed: Oct. 31, 2011

(65) Prior Publication Data

US 2012/0105882 A1 May 3, 2012

(30) Foreign Application Priority Data

Nov. 2, 2010 (JP) ................................. 2010-246043

(51) Int. Cl.
| H04N 1/60 | (2006.01) |
| G03F 3/08 | (2006.01) |
| H04N 1/46 | (2006.01) |
| H04N 1/00 | (2006.01) |
| G06F 7/60 | (2006.01) |
| B41J 29/393 | (2006.01) |

(52) U.S. Cl.
USPC ............ 358/1.9; 358/518; 358/523; 358/504; 358/402; 703/2; 347/19

(58) Field of Classification Search
USPC ............... 358/1.9, 518, 523, 504, 402; 703/2; 347/19
See application file for complete search history.

(56) References Cited

U.S. PATENT DOCUMENTS

| 7,207,645 B2 * | 4/2007 | Busch et al. .................... 347/19 |
| 8,390,882 B2 | 3/2013 | Dalal et al. |
| 8,619,324 B2 | 12/2013 | Horita |
| 2002/0180996 A1 * | 12/2002 | Allen et al. .................... 358/1.9 |
| 2003/0072043 A1 | 4/2003 | Hagai et al. |
| 2007/0058186 A1 | 3/2007 | Tanaka |
| 2009/0195845 A1 | 8/2009 | Hoshii et al. |
| 2009/0219554 A1 * | 9/2009 | Freyer et al. .................... 358/1.9 |
| 2011/0069333 A1 * | 3/2011 | Katayama et al. .............. 358/1.9 |
| 2011/0077921 A1 * | 3/2011 | Horita .............................. 703/2 |

FOREIGN PATENT DOCUMENTS

| EP | 1 267 217 A2 | 12/2002 |
| EP | 2 284 511 A1 | 2/2011 |
| JP | 06-246881 A | 9/1994 |
| JP | 2007-081586 A | 3/2007 |
| JP | 2011037266 A | 2/2011 |
| JP | 2011182373 A | 9/2011 |
| JP | 2011188091 A | 9/2011 |

OTHER PUBLICATIONS

Yukio Murata, "Basics and Applied Tehcnologies of Color Representation (Triceps)", Trikeps, pp. 71-98, with partial English translation, Sep. 20, 1990, 18 pages.

(Continued)

Primary Examiner — Marivelisse Santiago Cordero
Assistant Examiner — Temitayo Folayan
(74) Attorney, Agent, or Firm — Sughrue Mion, PLLC

(57) ABSTRACT

A print color predicting apparatus, a print color predicting method, and a recording medium having a program recorded therein acquire a spectral reflectance of a print, estimate a plurality of sets of optical property values of a protective film that covers the print, depending on the spectral reflectance of the print, and predict a spectral reflectance of a protective-film-covered print, using the spectral reflectance of the print and the sets of optical property values of the protective film.

17 Claims, 17 Drawing Sheets

(56) References Cited

OTHER PUBLICATIONS

Communication, dated Feb. 12, 2012, issued in corresponding EP Application No. 11187461.6, 13 pages.

D'Zmura et al., "The colors seen behind transparent filters," Perception, vol. 29, No. 8, Jan. 1, 2000, pp. 911-926, XP55018055.

Hébert et al., "Compositional reflectance and transmittance model for multilayer specimens," Journal of the Optical Society of America A, vol. 24, No. 9, Sep. 1, 2007, pp. 2628-2644, XP55017816.

Faul et al., "Psychophysical model of chromatic perceptual transparency based on substractive color mixture," Journal of the Optical Society of America A, vol. 19, No. 6, Jun. 1, 2002, pp. 1084-1095, XP55018050.

Paul Kubelka, "New Contributions to the Optics of Intensely Light-Scattering Materials. Part I", Journal of the Optical Society of America, May 1948, pp. 448-457, vol. 38. No. 5.

Toshiharu Enomae, "Paper properties and their evaluation methods with latest relevant testing standards", Journal of Japan Image Society 150, 2004. English Abstract.

Yukio Murata, "Basic and Applied Technologies of Color Representation (Triceps)", Triceps, pp. 71-98.

J. L. Saunderson, "Calculation of the Color of Pigmented Plastics", J. Opt. Soc. Am., Dec. 1942, pp. 727-736, vol. 32.

Communication, dated Feb. 13, 2012, issued in corresponding EP Application No. 11187461.6, 13 pages.

Rejection of the Application, dated Feb. 25, 2014, issued in corresponding JP Application No. 2010-246043, 7 pages in English and Japanese.

\* cited by examiner

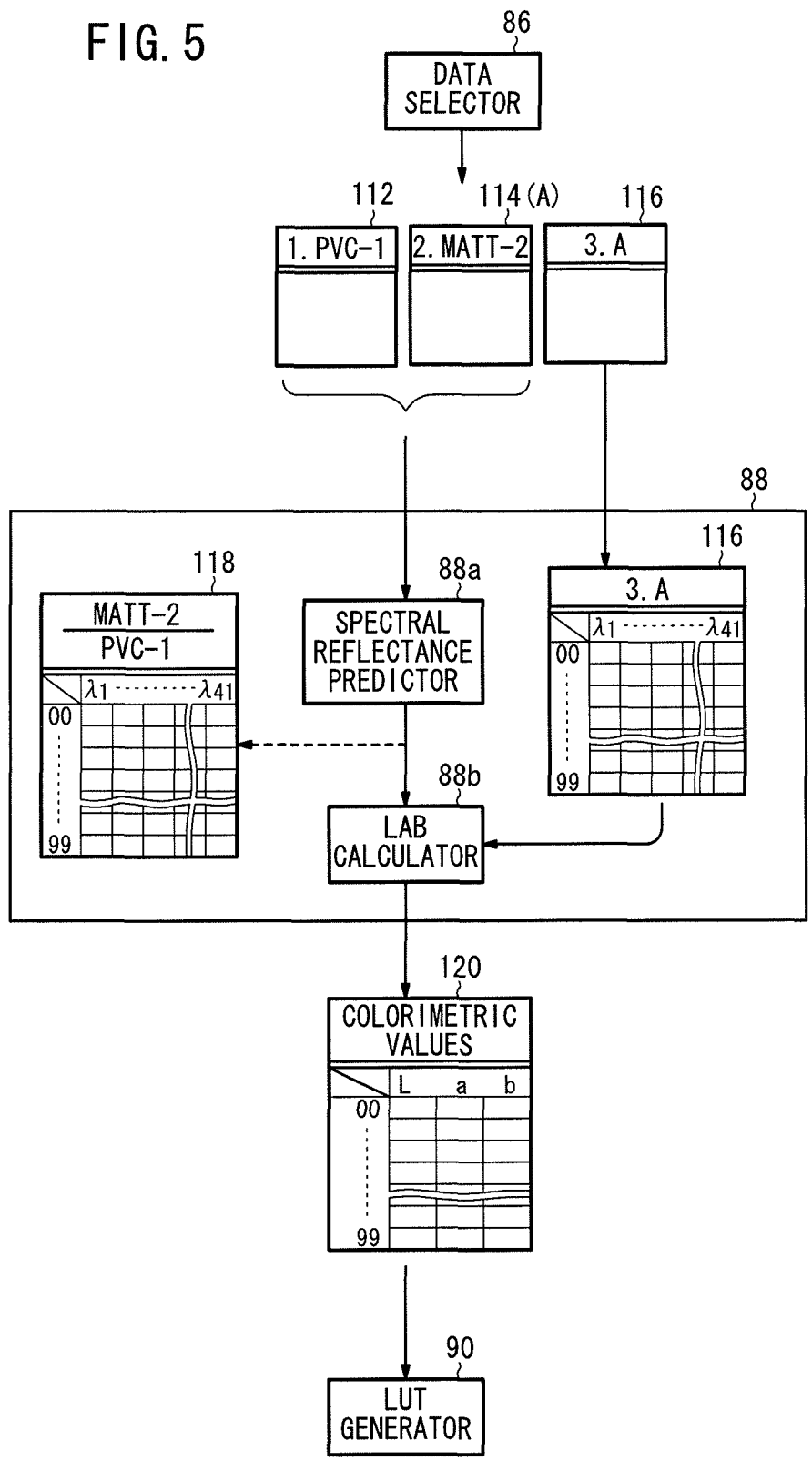

FIG. 6A

SETTING OF PROFILE GENERATING CONDITIONS

| PRINT MEDIUM | PVC(A) ▷ | 132 |
| LAMINATING FILM | MATT B ▷ | 134 |
| LIGHT SOURCE | A ▷ | 136 |
| PROFILE NAME | | 138 |

GENERATE — 140    CANCEL — 142

FIG. 6B

SETTING OF PROFILE GENERATING CONDITIONS

| PRINT MEDIUM | PVC(A) ▷ | 132 |
| | PVC(X) ◁ | 146 |
| | PVC(C) ▨ | 144 |
| | TARPAULIN A | |
| | TARPAULIN B ▷ | 138 |

GENERATE — 140    CANCEL — 142

FIG. 6C

SETTING OF PROFILE GENERATING CONDITIONS

| PRINT MEDIUM | PVC(A) ▷ | 132 |
| LAMINATING FILM | MATT B ▷ | 134 |
| | MATT B ▨ | 150 |
| | SEMIMATT A | 148 |
| | SEMIMATT B | |
| | GLOSS A ▷ | |

GENERATE — 140    CANCEL — 142

FIG. 6D

SETTING OF PROFILE GENERATING CONDITIONS

| PRINT MEDIUM | PVC(A) ▷ | 132 |
| LAMINATING FILM | MATT B ▷ | 134 |
| LIGHT SOURCE | A ▷ | 136 |
| | D50 ◁ | 154 |
| | D65 | |
| | A ▨ | |
| | F8 ▷ | |
| PROFILE NAME | | 152 |

CANCEL — 142

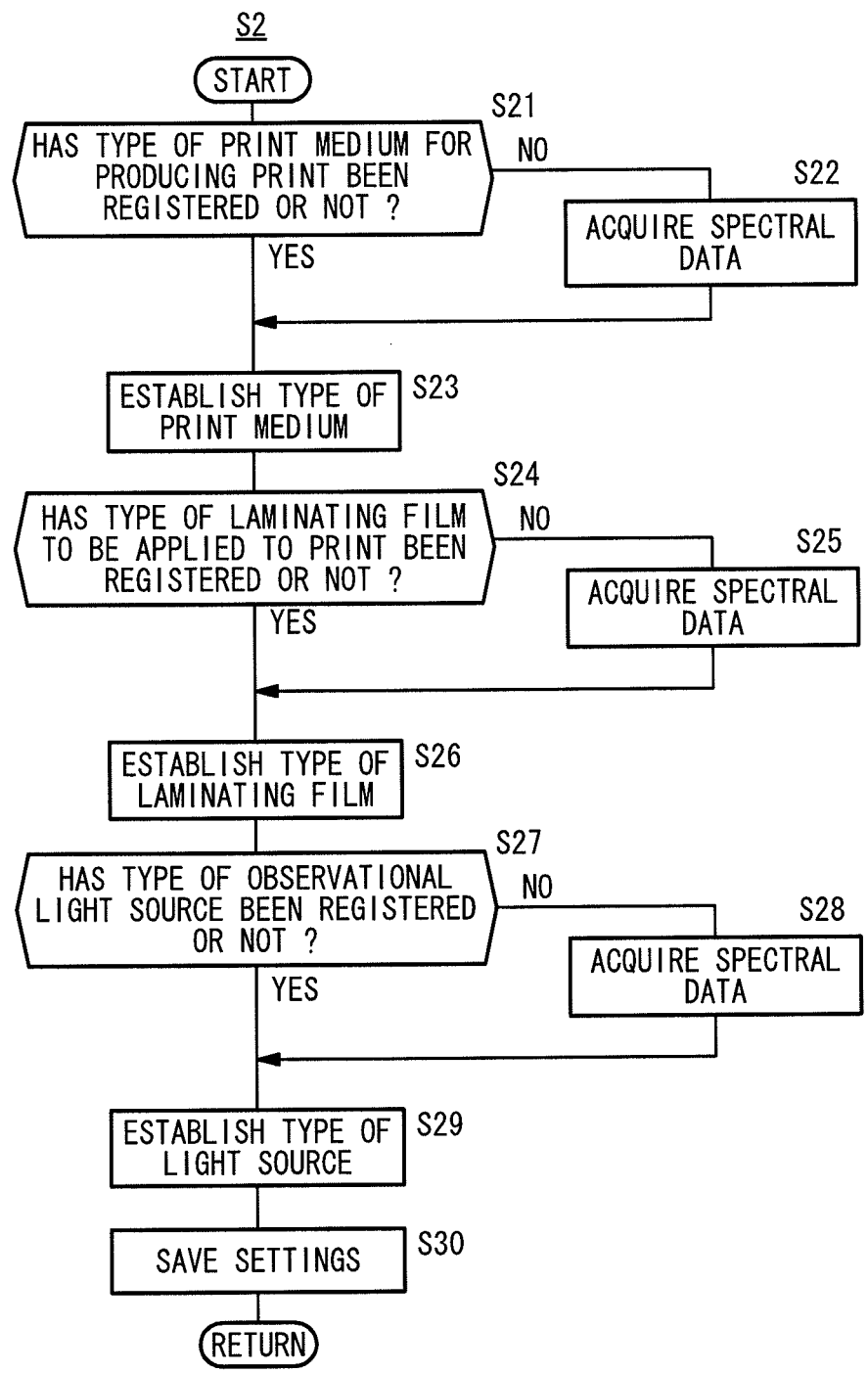

FIG. 14A

|  | C(%) | M(%) | Y(%) | K(%) |
|---|---|---|---|---|
| UNPRINTED AREA | 0 | 0 | 0 | 0 |
| FIRST AREA | 0 | 0 | 0 | 10 |
| SECOND AREA | 0 | 0 | 0 | 40 |
| THIRD AREA | 0 | 0 | 0 | 100 |

FIG. 14B

|  | C(%) | M(%) | Y(%) | K(%) |
|---|---|---|---|---|
| UNPRINTED AREA | 0 | 0 | 0 | 0 |
| FIRST AREA | 10 | 10 | 10 | 0 |
| SECOND AREA | 40 | 40 | 40 | 0 |
| THIRD AREA | 100 | 0 | 0 | 100 |

PRINT COLOR PREDICTING APPARATUS, PRINT COLOR PREDICTING METHOD, AND RECORDING MEDIUM

CROSS-REFERENCE TO RELATED APPLICATION

This application is based upon and claims the benefit of priority from Japanese Patent Application No. 2010-246043 filed on Nov. 2, 2010, of which the contents are incorporated herein by reference.

BACKGROUND OF THE INVENTION

1. Field of the Invention

The present invention relates to a print color predicting apparatus, a print color predicting method, and a recording medium having a program recorded therein for predicting color reproduction of a protective-film-covered print, i.e., a print that is covered with a protective film.

2. Description of the Related Art

With significant advances in inkjet technology in recent years, it is becoming possible for inkjet printers to produce large color prints of high quality at high speeds. Inkjet printers are not only popular for private or home use, but also are widely used in commercial applications nowadays. Inkjet printers make it possible to print on POP (Point Of Purchase) posters, wall posters, large-size mediums such as outdoor advertisements and billboards, roll mediums, and thick hard mediums.

There are a wide variety of print mediums (hereinafter also referred to as "mediums") available for use in prints to meet various commercial demands. For example, such print mediums include paper mediums such as synthetic paper, thick paper, aluminum-evaporated paper, etc., resin mediums such as vinyl chloride, PET, etc., and tarpaulin paper made of a woven fiber cloth with synthetic resin films applied to both surfaces thereof.

Since advertisement prints are expected to be effective to arouse consumers' motivation to buy advertised products through visual sensation, the finish of colors of the prints is of particular importance. Heretofore, there have been disclosed various color matching technologies such as a method of generating an ICC (International Color Consortium) profile, a method of adjusting a designated color, etc., as print color managing means.

Advertisement prints are displayed in a variety of places including outdoor areas, indoor areas, and spotlighted exhibition sites. Generally, the spectral characteristics (spectral energy distribution) of environmental light as an observational light source for prints vary depending on the different places where the prints are displayed.

If different observational light sources are used with prints, then since the spectral light characteristics that are emitted from the different observational light sources and ultimately reach the retina of a human observer are different, the appearance (color impression) of the print, which is visually perceived by the observer, tends to vary depending on the observational light sources, although this tendency may differ from observer to observer. As a consequence, if the observational environment in which a print is produced, i.e., the location where the printer is installed, and the observational environment in which the print is displayed are significantly different from each other, then the print may possibly fail to exhibit desired colors.

As one solution to the above problem, Japanese Laid-Open Patent Publication No. 2007-081586 discloses a method of and an apparatus for storing spectral data of prints and a plurality of light source spectral data independently of each other, and for generating a profile appropriate for an observational light source each time that the observational light source is established. It is stated in the publication that the disclosed method and apparatus make it possible to generate a profile corresponding to each observational light source with a reduced number of colorimetric steps, and to manage colors of prints depending on observational light sources.

Prints produced by inkjet printers are likely to fail to withstand use in vigorous environments because the images on the prints are not durable enough, and in particular, they lack abrasion resistance and toughness.

For example, color images on inkjet prints tend to be discolored gradually at display sites that are constantly exposed to highly intensive radiant light, since the pigments contained in the inks are gradually decomposed by chemical reactions. In a display mode on indoor floors, color images on inkjet prints are liable to become damaged, because the surfaces of the prints come into contact with and are rubbed by people walking on the floors.

It has been customary to make color images on inkjet prints more durable by covering image-formed surfaces of the prints with a protective film such as a laminating film, which includes an ultraviolet absorbent added thereto, or which is mechanically processed by embossing or the like.

For example, Japanese Laid-Open Patent Publication No. 06-246881 discloses a protective-film-covered print, i.e., a print with a protective film applied to an image-formed surface thereof. It is stated in the publication that the protective film makes the print less permeable and resistant to scratching and alcohol, thereby increasing the quality of the print surface.

SUMMARY OF THE INVENTION

According to research and study efforts made by the inventors of the present invention, however, it has been found that although the laminating film has a high transmittance, the laminating film unnegligibly changes the appearance of color images covered thereby, because the spectral transmittance distribution thereof is not necessarily flat in the visible wavelength range. It has also been found that there are a wide variety of types of commercially available laminating films having different spectral transmittance distributions.

Even if the method and the apparatus disclosed in Japanese Laid-Open Patent Publication No. 2007-081586 were applied to the protective-film-covered print disclosed in Japanese Laid-Open Patent Publication No. 06-246881, in order to obtain profiles of prints with protective films, it is necessary to colorimetrically measure the prints with the image-formed surfaces thereof being covered by laminating films, i.e., prints with the protective films themselves. If strict color reproduction is to be carried out on all combinations of laminating films and prints, then it is highly tedious and time-consuming to prepare and colorimetrically measure such samples. If characteristics of laminating films are ignored, then the appearance of color images on prints, which are covered with such laminating films, varies depending on the type of laminating film that is used.

It is an object of the present invention to provide a print color predicting apparatus, a print color predicting method, and a recording medium having a program recorded therein, which make it possible to significantly reduce the number of steps required to print a color chart, cover the color chart with a protective film, and colorimetrically measure the color chart covered with the protective film, without lowering the accuracy with which colors of the protective-film-covered print are reproduced.

According to an aspect of the present invention, there is provided a print color predicting apparatus comprising a data acquirer for acquiring a spectral reflectance of a print, an optical property value estimator for estimating a plurality of sets of optical property values of a protective film covering the print, depending on the spectral reflectance of the print, and a spectral reflectance predictor for predicting a spectral reflectance of a protective-film-covered print, using the spectral reflectance of the print, which is acquired by the data acquirer and the sets of optical property values of the protective film, which are estimated by the optical property value estimator.

With the above arrangement, it is possible to significantly reduce the number of operating steps required to generate a profile, or more specifically, to reduce the number of steps required for printing a color chart, covering it with the protective film, and colorimetrically measuring the color chart that is covered with the laminating film, without lowering the accuracy with which colors of the protective-film-covered print are reproduced. Furthermore, inasmuch as a plurality of sets of optical property values of the protective film are used, the accuracy with which the spectral reflectance of the protective-film-covered print is predicted is increased. These advantages are particularly effective in a case where the optical property values of the protective film are changed depending on the spectral reflectance of a certain print combined with the protective film.

The print color predicting apparatus should preferably further comprise a sample data acquirer for acquiring first spectral reflectances of at least three types of sample prints, and second spectral reflectances of the at least three types of sample prints having the protective film disposed thereon. The optical property value estimator should preferably select a plurality of sets of combinations of a plurality of types of sample prints from the at least three types of sample prints, and estimate the optical property values of the protective film from a relationship based on a predetermined mathematical model, using each of the first spectral reflectances and each of the second spectral reflectances acquired by the sample data acquirer, for each of the combinations of the types of sample prints.

The optical property value estimator should preferably estimate the optical property values of the protective film depending on the spectral reflectance of the print, based on a predetermined calculating process using each of the first spectral reflectances and the optical property values of the protective film, which are estimated for each of the combinations of the types of sample prints.

Preferably, the predetermined calculating process in the optical property value estimator comprises an interpolating process and an extrapolating process.

Preferably, the predetermined calculating process in the optical property value estimator comprises an approximating process based on at least a tertiary polynomial.

The at least three types of sample prints should preferably include a black sample print, and the sample data acquirer should preferably further acquire a first spectral reflectance of the black sample print and a second spectral reflectance of the black sample print having the protective film disposed thereon.

The optical property value estimator should preferably select a plurality of sets of combinations of at least two types of sample prints including the black sample print.

The sample data acquirer should preferably acquire the first spectral reflectances and the second spectral reflectances of the sample prints, in which at least one of the color and the number of types of the sample prints has been changed depending on the type of a medium of the print.

The sample data acquirer should preferably acquire the first spectral reflectances and the second spectral reflectances of the sample prints, in which at least one of the color and the number of types of the sample prints has been changed depending on the type of a printing machine for producing the print.

The relationship based on the predetermined mathematical model should preferably be a system of simultaneous equations, and the optical property value estimator should preferably estimate optical properties of the protective film by solving the simultaneous equations.

The predetermined mathematical model should preferably be constructed for each of the types of sample prints.

The print color predicting apparatus should preferably further comprise a colorimetric value calculator for calculating a colorimetric value of the protective-film-covered print using the spectral reflectance of the protective-film-covered print, which is predicted by the spectral reflectance predictor.

The data acquirer should preferably further acquire a spectral distribution of an observational light source, and the colorimetric value calculator should preferably calculate a colorimetric value of the protective-film-covered print further using the spectral distribution of the observational light source, which is acquired by the data acquirer.

The data acquirer should preferably acquire from a database at least one of the spectral reflectance of the print and a spectral distribution of an observational light source.

The optical property values of the protective film should preferably comprise two independent optical property values of an inherent reflectance, a scattering coefficient, and an absorption coefficient for each wavelength of the protective film.

The print color predicting apparatus should preferably further comprise a profile generator for generating a profile based on the colorimetric value of the protective-film-covered print, which is calculated by the colorimetric value calculator.

The print color predicting apparatus should preferably further comprise a data selector for selecting at least one of the type of a medium of the print, the type of protective film, and the type of observational light source, wherein the profile generator generates the profile using at least one of the spectral reflectance depending on the type of medium which is selected by the data selector, the optical property values depending on the type of protective film, which is selected by the data selector, and a spectral distribution depending on the type of observational light source, which is selected by the data selector.

According to another aspect of the present invention, there is also provided a print color predicting method comprising acquiring a spectral reflectance of a print, estimating a plurality of sets of optical property values of a protective film covering the print, depending on the spectral reflectance of the print, and predicting a spectral reflectance of a protective-film-covered print, using the spectral reflectance of the print, which is acquired, and the sets of optical property values of the protective film, which are estimated.

According to still another aspect of the present invention, there is also provided a recording medium storing therein a program to be executed by a computer, the program enabling the computer to function as a data acquirer for acquiring a spectral reflectance of a print, an optical property value estimator for estimating a plurality of sets of optical property values of a protective film covering the print, depending on the spectral reflectance of the print, and a spectral reflectance predictor for predicting a spectral reflectance of a protective-film-covered print, using the spectral reflectance of the print, which is acquired by the data acquirer, and the sets of optical property values of the protective film, which are estimated by the optical property value estimator.

The print color predicting apparatus, the print color predicting method, and the recording medium according to the present invention acquire a spectral reflectance of a print, estimate a plurality of sets of optical property values of a protective film covering the print depending on the spectral reflectance of the print, and predict a spectral reflectance of a protective-film-covered print using the spectral reflectance of the print, which is acquired, and the sets of optical property values of the protective film, which are estimated. Furthermore, inasmuch as a plurality of sets of optical property values of the protective film are used, the accuracy with which the spectral reflectance of the protective-film-covered print is predicted is increased. These advantages are particularly effective in a case where the optical property values of the protective film are changed depending on the spectral reflectance of a certain print combined with the protective film.

The above and other objects, features, and advantages of the present invention will become more apparent from the following description in a case where taken in conjunction with the accompanying drawings in which a preferred embodiment of the present invention is shown by way of illustrative example.

BRIEF DESCRIPTION OF THE DRAWINGS

FIG. 5 is a functional block diagram of a colorimetric value calculator shown in FIG. 4;

FIGS. 6A through 6D are views showing, by way of example, setting images used for setting profile generating conditions;

FIG. 8 is a flowchart of a sequence for generating a profile according to the embodiment;

FIGS. 14A and 14B are tables showing examples of design values for colors of the measurement specimen shown in FIG. 13;

DESCRIPTION OF THE PREFERRED EMBODIMENTS

A print color predicting method according to an embodiment of the present invention in relation to a print color predicting apparatus and a printing system that carry out the print color predicting method will be described in detail below with reference to FIGS. 1 through 17 of the accompanying drawings.

Figure 1:
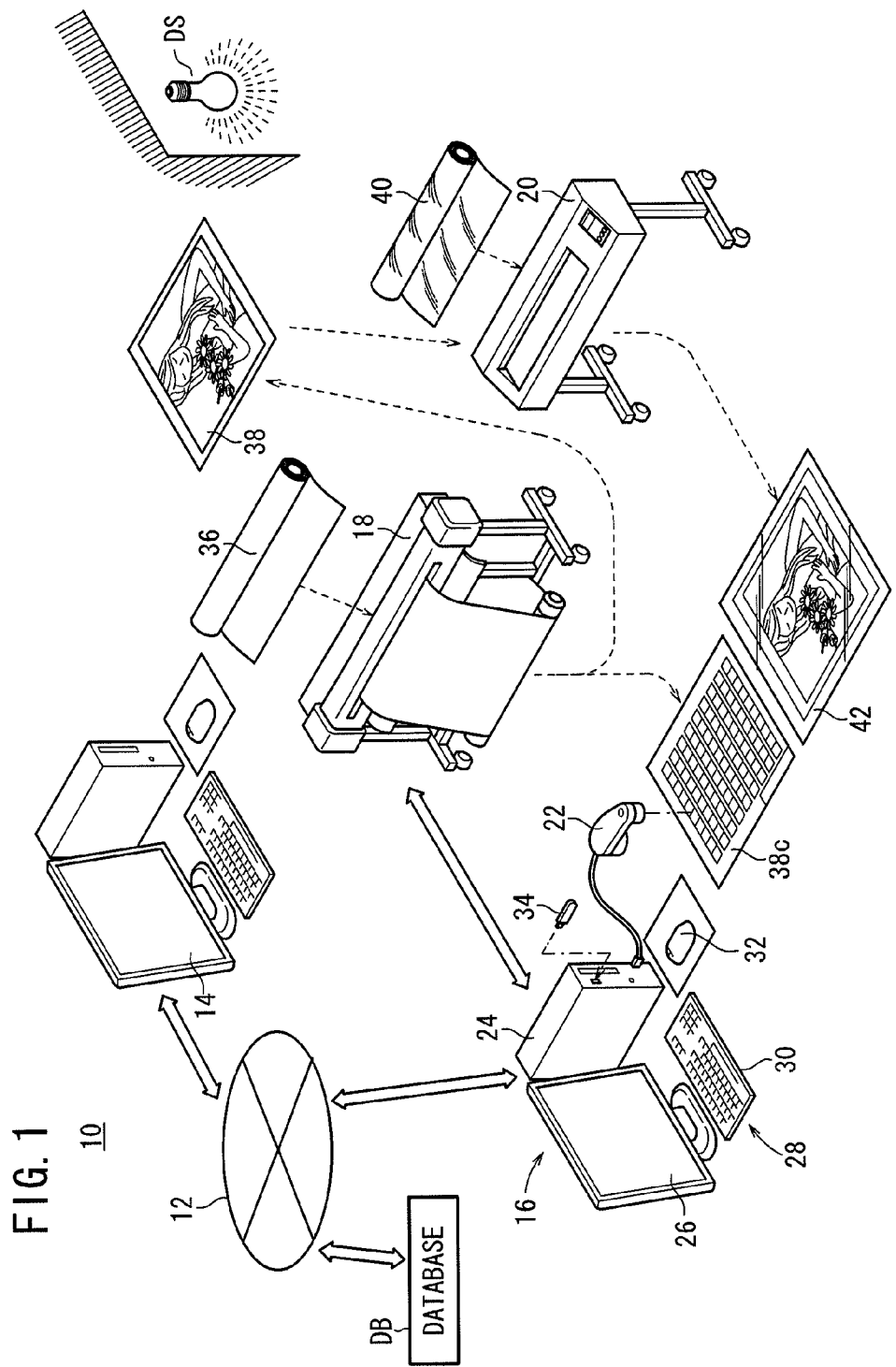
FIG. 1 is a perspective view of a printing system incorporating a print color predicting apparatus according to an embodiment of the present invention.

FIG. 1 shows in perspective a printing system 10 incorporating an image processing apparatus 16 as a print color predicting apparatus according to an embodiment of the present invention.

As shown in FIG. 1, the printing system 10 basically comprises a network 12, an editing apparatus 14, an image processing apparatus 16 as a print color predicting apparatus, a printing machine 18, a laminating apparatus 20, and a colorimeter 22.

The network 12 comprises an information communication network constructed according to communication standards such as Ethernet (registered trademark) or the like. The editing apparatus 14, the image processing apparatus 16, and a database DB are connected to each other by a wired or wireless link through the network 12.

The editing apparatus 14 is capable of editing the arrangement of color images made up of characters, figures, pictures, photos, etc., on each of pages to be printed. The editing apparatus 14 generates electronic manuscripts in a page description language (hereinafter referred to as "PDL"), e.g., 8-bit image data in color channels of four colors (C, M, Y, K) or three colors (R, G, B).

PDL refers to a language which is descriptive of image information including format information, position information, color information (including density information), etc., of characters, figures, etc., in a "page" that serves as an output unit for printing, displaying, or the like. Known types of PDL include PDF (Portable Document Format according to ISO32000-1:2008). PostScript (registered trademark) of AdobeSystems, and XPS (XML Paper Specification).

A color scanner, not shown, is connected to the editing apparatus 14. The color scanner is capable of optically reading a color original set in position. Therefore, the editing apparatus 14 can acquire, as image data of an electronic manuscript, color image data from the color scanner based on the color original read thereby.

The image processing apparatus 16 has a function to convert the color image data of an electronic manuscript described by PDL and acquired from the editing apparatus 14 into bitmap image data (a type of raster image data) and perform desired image processing, e.g., a color conversion process, an image scaling process, an image arranging process, etc., on the bitmap image data, a function to convert the processed bitmap image data into print signals that match the printing process of the printing machine 18, and a function to send the print signals to the printing machine 18.

The image processing apparatus 16 comprises a main unit 24 including a CPU, a memory, etc., a display device 26 for displaying color images, and an input device 28 as an input unit including a keyboard 30 and a mouse 32. A portable memory 34, which is capable of freely recording and erasing electronic data, and the colorimeter 22 are connected to the main unit 24 of the image processing apparatus 16.

The printing machine 18 comprises an inkjet printing apparatus for producing a color image based on a combination of standard inks of colors C, M, Y, K (process colors) and optional inks of light colors such as LC, LM, etc., and W (white). The printing machine 18 controls the propulsion of inks onto a print medium 36 (a rolled non-printed medium as shown in FIG. 1) based on print signals received from an external apparatus, e.g., the image processing apparatus 16, to print a color image on the print medium 36, thereby producing a print 38, which may include a color chart 38c.

The laminating apparatus 20 applies a laminating film 40 as a protective film to the image-formed surface of the print 38 and, if necessary, to the reverse surface thereof, and heats and presses the laminating film 40 onto the print 38 with a heating roller, not shown, thereby producing a protective-film-covered print 42, in which the image-formed surface of the print 38 is protected by the laminating film 40.

The print medium 36 may comprise a paper medium such as synthetic paper, thick paper, aluminum-evaporated paper, or the like, a resin medium such as vinyl chloride, PET, or the like, or tarpaulin paper, or the like. The protective film applied to the print 38 is not limited to a laminating film 40, but may be formed from a liquid, varnish, transparent ink, clear toner, or the like, or may comprise a protective sheet such as an acrylic sheet or the like.

The colorimeter 22 measures colorimetric values of an object to be measured in response to a given colorimetric action. Such colorimetric values refer not only to tristimulus values X, Y, Z, the coordinates L*, a*, b* of a uniform color space, etc., but also to a distribution of optical physical values (hereinafter referred to as "spectral data") with respect to wavelengths, e.g., a spectral radiance distribution (spectral distribution), a spectral sensitivity distribution, a spectral reflectivity, or a spectral transmittance.

The database DB comprises a database server for managing data such as job tickets of electronic manuscripts, e.g., JDF (Job Definition Format) files, color sample data, target profiles, or profiles suitable for print mediums 36.

The protective-film-covered print 42 thus produced is displayed at a given site under a light source DS as an observational light source.

Figure 2:
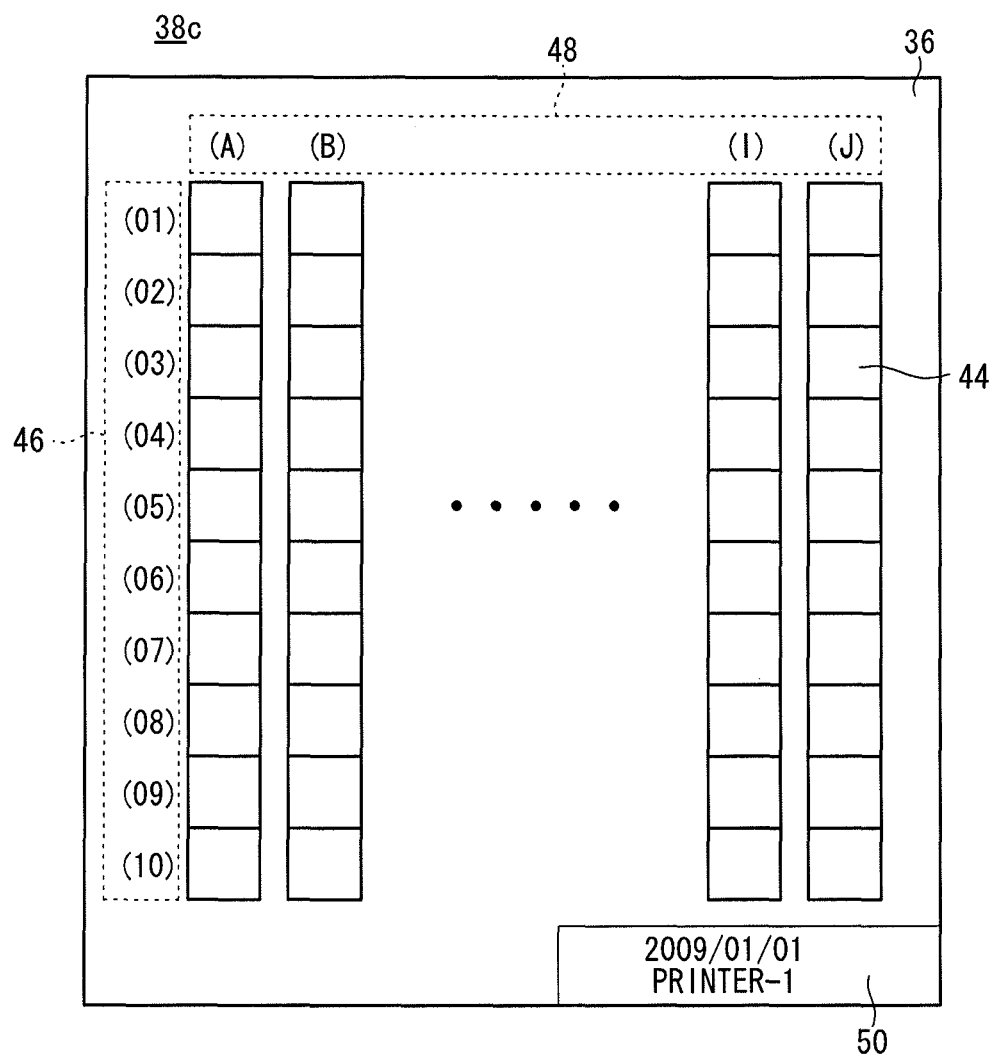
FIG. 2 is a front elevational view of a color chart shown in FIG. 1.

FIG. 2 is a front elevational view of the color chart 38c shown in FIG. 1.

As shown in FIG. 2, the color chart 38c comprises one hundred color patches 44 of different colors, which are substantially identical in shape and arranged in rows and columns, a sequence of numbers 46 and a sequence of alphabetical letters 48 for identifying positions of the color patches 44 along directions of the rows and columns, and print information 50 for identifying conditions for printing the color chart 38c, all of which are printed on the print medium 36.

The color patches 44 are arranged in a matrix having 10 vertical columns and 10 horizontal rows, spaced from each other by given intervals. The colors of the respective color patches 44 are set to given values in a range of signal levels of C, M, Y, K values (a percentage range from 0% to 100% or an 8-bit gradation range from 0 to 255).

The sequence of numbers 46 represents a vertical string of characters ranging from (01) to (10) positioned in alignment with and to the left of the respective rows of color patches 44.

The sequence of alphabetical letters 48 represents a horizontal string of characters ranging from (A) to (J) positioned in alignment with and at the top of the respective columns of color patches 44.

The print information 50 is printed on the print medium 36 and represents a type and serial number or a registered name of the printing machine 18, a print mode to be described later, the type of print medium 36, a print date, etc.

Figure 3:
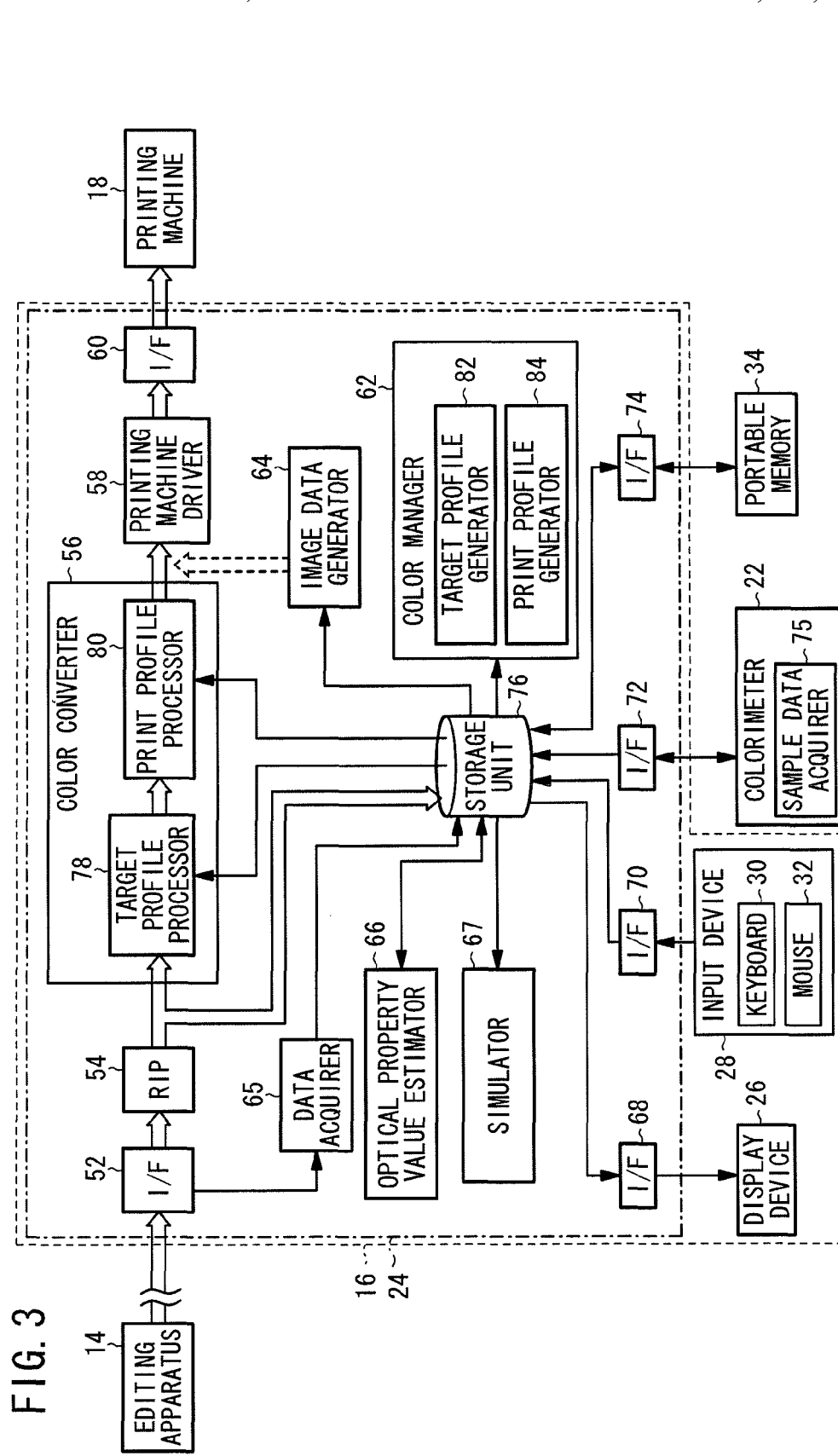
FIG. 3 is a functional block diagram of the print color predicting apparatus shown in FIG. 1.

FIG. 3 is a functional block diagram of the image processing apparatus 16 according to the present embodiment. In FIG. 3, an electronic manuscript is supplied along the directions indicated by the outlined solid-line arrows, color-chart image data are supplied along the directions indicated by the outlined broken-line arrows, and various other data are supplied along the directions indicated by the solid-line arrows.

As shown in FIG. 3, the main unit 24 of the image processing apparatus 16 includes an I/F 52 for entering an electronic manuscript supplied from the editing apparatus 14, a RIP (Raster Imaging Processor) 54 for converting the PDL format of the electronic manuscript supplied from the I/F 52 into a raster format, a color converter 56 for performing a color conversion process on the converted C, M, Y, K values (or R, G, B values) of the electronic manuscript supplied from the RIP 54 in order to produce image data of new C, M, Y, K values, a printing machine driver 58 for converting the image data of the new C, M, Y, K values produced by the color converter 56 into print control signals (ink propulsion control data) that match the printing machine 18, and an I/F 60 for outputting the print signals generated by the printing machine driver 58 to the printing machine 18.

The main unit 24 also includes a color manager 62 for managing profiles for different printing machines 18, an image data generator 64 for generating image data to print the color chart 38c, a data acquirer 65 for acquiring spectral data of the print medium 36, the laminating film 40, and/or the light source DS from an external device, an optical property value estimator 66 for estimating optical property values of the laminating film 40 from a relationship based on a given mathematical model, a simulator 67 for preliminarily calculating optical property values of the laminating film 40 based on various variables, an I/F 68 for connection to the display device 26, an I/F 70 for connection to the input device 28 including the keyboard 30 and the mouse 32, an I/F 72 for connection to the colorimeter 22, and an I/F 74 for connection to the portable memory 34.

The colorimeter 22 functions as a sample data acquirer 75 for acquiring spectral reflectances of at least three types of sample prints, to be described later.

The main unit 24 also includes a storage unit 76 for storing various data supplied from various components of the main unit 24, and for supplying the stored data to various components of the main unit 24. The storage unit 76 is connected to the RIP 54, the color converter 56, the color manager 62, the image data generator 64, the data acquirer 65, the optical property value estimator 66, the simulator 67, the I/F 68, the I/F 70, the I/F 72, and the I/F 74.

The color converter 56 comprises a target profile processor 78 for converting device-dependent data into device-independent data, and a print profile processor 80 for converting device-independent data into device-dependent data. Device-dependent data refer to data defined in terms of C, M, Y, K values, R, G, B values, or the like for appropriately driving various devices. Device-independent data refer to data defined in terms of a display system such as an HSV (Hue-Saturation-Value) system, an HLS (Hue-Lightness-Saturation) system, a CIELAB system, a CIELUV system, an XYZ system, or the like.

The color manager 62 comprises a target profile generator 82 for generating target profiles for respective printing machines 18, and a print profile generator 84 for generating print profiles for respective printing machines 18.

The RIP 54 can perform various image processing techniques including an image scaling process depending on the resolution, etc., of the printing machine 18, and a rotating and inverting process depending on a printing format at the time an electronic manuscript is converted into raster data.

The printing machine driver 58 generates ink propulsion control data corresponding to ink colors (C, M, Y, K, LC, LM, or W) from C, M, Y, K values. The ink propulsion control data are data for appropriately controlling the printing machine 18 to eject inks (ink ejection ON/OFF, ink dot diameters, etc.). The printing machine driver 58 may generate the ink propulsion control data according to a known algorithm such as a dither matrix method, an error diffusion method, or the like, although conversion is required from an 8-bit multiple-gradation image into a low-gradation image such as a binary image.

The target profile processor 78 or the print profile processor 80 is capable of correcting a profile depending on a print mode of the printing machine 18. The print mode refers to various print settings such as the number of nozzles of the print head, the timing (unidirectional/bidirectional) of ink ejection during scanning of the print head, the number of passes, the number and type of inks used in the printing machine 18, an algorithm for generating ink propulsion control data, etc.

The main unit 24 has a controller (not shown) comprising a CPU, etc., for controlling all of the image processing steps referred to above. More specifically, the controller controls not only operations of various components of the main unit 24, e.g., reading data from and writing data to the storage unit 76, but also transmission of display signals via the I/F 68 to the display device 26, and acquisition of colorimetric data from the colorimeter 22 via the I/F 72.

The image processing apparatus 16 according to the first embodiment is basically constructed as described above. The image processing functions described above can be performed according to application programs stored in the storage unit 76, which operate under the control of a basic program (operating system).

The programs may be recorded in a computer-readable recording medium (e.g., the portable memory 34 shown in FIG. 1), and may be read into a computer system and executed thereby. The term "computer system" refers to an OS and hardware including peripheral devices. The computer-readable recording medium comprises a portable medium comprising a storage device such as a flexible disk, a magnetooptical disk, a CD-ROM, or the like, or a storage unit such as a hard disk or the like incorporated in the computer system. The computer-readable recording medium may also include a medium for dynamically holding programs for a short period of time, such as a communication line for transmitting programs via a network such as the Internet or the like, or a communication channel such as a telephone line, or a memory for holding programs for a certain period of time such as a volatile memory in a computer system, which operates as a server or a client in a network environment.

Figure 4:
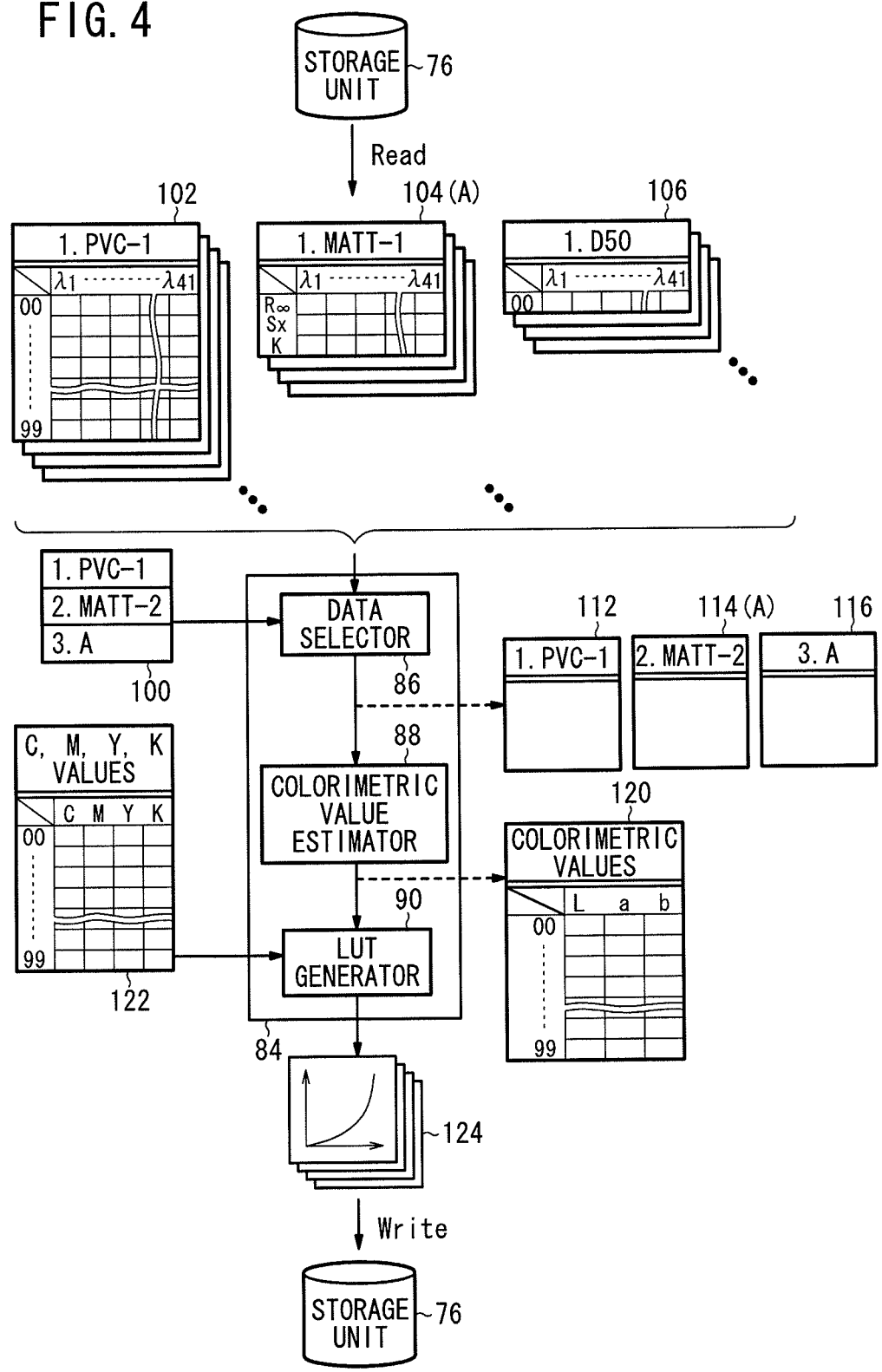
FIG. 4 is a functional block diagram of a print profile generator shown in FIG. 3.

FIG. 4 is a functional block diagram of the print profile generator 84 shown in FIG. 3.

The print profile generator 84 basically comprises a data selector 86, a colorimetric value estimator 88, and a LUT generator (profile generator) 90.

The data selector 86 selects spectral data of a print medium under profile generating conditions (hereinafter referred to as "first spectral data 112") based on setting data 100 and a group 102 of spectral data of print mediums, which are read from the storage unit 76. The data selector 86 selects spectral data of a laminating film under profile generating conditions (hereinafter referred to as "second spectral data 114") based on the setting data 100 and a group 104 of spectral data of laminating films, which are read from the storage unit 76. The data selector 86 selects spectral data of an observational light source under profile generating conditions (hereinafter referred to as "third spectral data 116") based on the setting data 100 and a group 106 of spectral data of observational light sources, which are read from the storage unit 76. The setting data 100 represent types of the print medium 36, the laminating film 40, and the light source S, which are set by the operator, and which serve as setting data relative to the profile generating conditions.

The colorimetric value estimator 88 estimates colorimetric value data 120 under profile generating conditions based on the first spectral data 112, the second spectral data 114, and the third spectral data 116, which are selected by the data selector 86.

The LUT generator 90 generates a LUT 124 under profile generating conditions based on the colorimetric value data 120 estimated by the colorimetric value estimator 88, and C, M, Y, K value data 122 corresponding to the respective color patches 44 (see FIG. 2).

In the present embodiment, spectral data are provided respectively in association with one hundred color patches 44 patch numbers of which range from 0 to 99, and light wavelengths having forty-one data $\lambda_1$ through $\lambda_{41}$. For example, the light wavelengths are represented by $\lambda_1=400$ nm, ..., $\lambda_{41}=800$ nm at intervals of 10 nm.

FIG. 5 is a functional block diagram of the colorimetric value estimator 88 shown in FIG. 4.

As shown in FIG. 5, the colorimetric value estimator 88 basically comprises a spectral reflectance predictor 88a and a Lab calculator (colorimetric value calculator) 88b.

The spectral reflectance predictor 88a predicts a spectral reflectance of the protective-film-covered print 42 (hereinafter referred to as "fourth spectral data 118") based on the first spectral data 112 and the second spectral data 114 supplied from the data selector 86 by applying a Kubelka-Munk model, to be described later.

The first spectral data 112 represent the spectral reflectance of the print medium 36, and the second spectral data 114 represent inherent reflectances, scattering coefficients, and absorption coefficients (optical property values) of the laminating film 40 with respect to different light wavelengths.

The Lab calculator 88b calculates colorimetric value data 120 under profile generating conditions based on the third spectral data 116 supplied from the data selector 86, the fourth spectral data 118 predicted by the spectral reflectance predictor 88a, and an unillustrated color-matching function (spectral data in view of the visual characteristics of a standard observer).

FIGS. 6A through 6D are views showing, by way of example, setting images for setting profile generating conditions.

FIG. 6A shows a setting image 130 having three pull-down menus 132, 134, 136, a textbox 138, and buttons 140, 142 indicating "GENERATE" and "CANCEL", respectively, arranged successively downwardly.

The setting image 130 includes a string of letters indicating "MEDIUM" on the left side of the pull-down menu 132. In a case where the operator operates the mouse 32 in a certain way, a selection column 144 also is displayed beneath the pull-down menu 132, as shown in FIG. 6B, with a scroll bar 146 provided on the right side of the selection column 144.

The setting image 130 includes a string of letters indicating "LAMINATE" on the left side of the pull-down menu 134. In a case where the operator operates the mouse 32 in a certain way, a selection column 148 also is displayed beneath the pull-down menu 134, as shown in FIG. 6C, with a scroll bar 150 provided on the right side of the selection column 148.

The setting image 130 includes a string of letters indicating "LIGHT SOURCE" on the left side of the pull-down menu 136. In a case where the operator operates the mouse 32 in a certain way, a selection column 152 also is displayed beneath the pull-down menu 136, as shown in FIG. 6D, with a scroll bar 154 provided on the right side of the selection column 152.

The setting image 130 includes a string of letters indicating "PROFILE NAME" on the left side of the textbox 138. By operating the keyboard 30, the operator can enter character information into the textbox 138.

Figure 7:
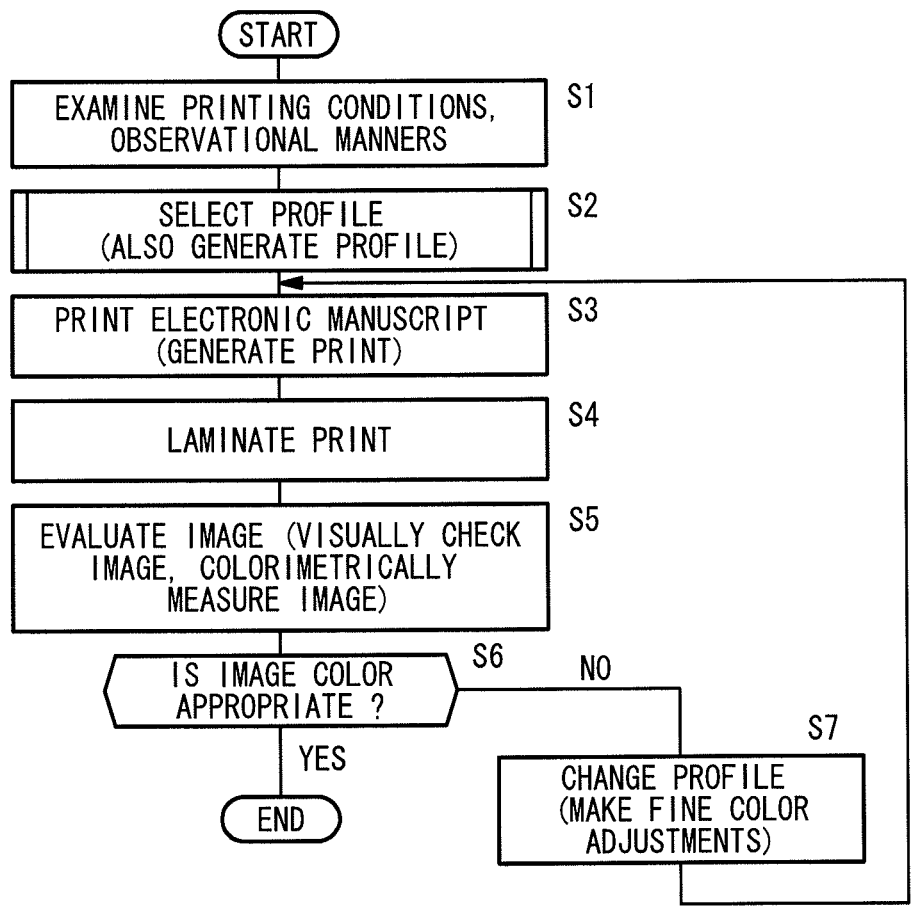
FIG. 7 is a flowchart of a sequence for producing a protective-film-covered print of appropriate colors using the printing system shown in FIG. 1.

The printing system 10 according to the present embodiment is basically constructed as described above. Operations of the printing system 10 will be described below with reference to FIGS. 1 and 7. FIG. 7 is a flowchart of a sequence for producing a protective-film-covered print of appropriate colors using the printing system shown in FIG. 1.

The operator examines printing conditions and observational manners of a protective-film-covered print 42 to be produced (step S1). Printing conditions refer to the type of printing machine 18 used to produce the protective-film-covered print 42, the type of print medium 36, the type of laminating film 40, the print mode referred to above, etc. Observational manners refer to not only attributes (type, spectral data) of the light source DS as the observational light source, but also to the image type of the protective-film-covered print 42 to be observed. The image type may refer to a reflective image (an image using a reflective light source as a main light source), a transmissive image (an image using a transmissive light source as a main light source), or a mixed image (an image using a combination of reflective and transmissive light sources as a main light source).

Then, the operator selects a profile suitable for the printing machine 18 (step S2). Normally, a target profile or a print profile is stored in the storage unit 76 of the main unit 24. If a profile suitable for the printing machine 18 has not been registered, i.e., is not stored in the storage unit 76, then a print profile can be generated separately.

Then, an electronic manuscript is printed using the printing machine 18, thereby producing a print 38 (step S3). The print 38 is then laminated (step S4).

More specifically, the laminating film 40 is applied to the image-formed surface of the print 38 and, if necessary, to the reverse surface thereof, and then the laminating film 40 is heated and pressed by a heating roller of the laminating apparatus 20, thereby producing a protective-film-covered print 42. The protective-film-covered print 42 thus produced has an increased level of abrasion resistance and toughness.

Then, the operator evaluates colors of the color image of the protective-film-covered print 42 (step S5), and determines whether or not the colors of the color image are appropriate (step S6). The operator may evaluate the colors of the color image to determine whether or not desired hues are obtained, either by visually checking the color image based on observation of an overall or partial appearance of the color image, or by obtaining a colorimetric value of a certain area of the protective-film-covered print 42 with the colorimeter 22, and then determining whether or not the obtained colorimetric value falls within a desired range.

If, as a result of the image evaluation, the operator judges that the colors of the color image of the protective-film-covered print 42 are not suitable, then the operator changes the profile to make fine adjustments to the colors of the color image (step S7). More specifically, the operator may reset the profile or regenerate a profile, or may make fine adjustments to the profile, i.e., may correct the presently set profile.

Thereafter, an electronic manuscript is printed and colors of the printed color image are evaluated repeatedly (steps S3 through S7) until a protective-film-covered print 42 having desired colors is obtained.

An image processing sequence of the image processing apparatus 16 for printing an electronic manuscript (step S3) will be described in detail below with reference to FIG. 3.

In a case where an electronic manuscript in PDL format supplied from the editing apparatus 14 is input to the image processing apparatus 16 via the network 12 and the I/F 52, the electronic manuscript is converted by the RIP 54 into 8-bit C, M, Y, K raster data (device-dependent image data). The 8-bit C, M, Y, K raster data then are converted by the target profile processor 78 into $L^*$, $a^*$, $b^*$ data (device-independent image data). The $L^*$, $a^*$, $b^*$ data then are converted by the print profile processor 80 into C, M, Y, K value data (device-dependent image data). The C, M, Y, K value data then are converted by the printing machine driver 58 into print control signals (ink propulsion control data). The print control signals are supplied from the printing machine driver 58 via the I/F 60 to the printing machine 18. Thereafter, the printing machine 18 produces a desired print 38 based on the print control signals.

Target profiles and print profiles corresponding to a plurality of set conditions have been stored beforehand in the storage unit 76. A target profile and a print profile are selectively supplied to the target profile processor 78 and the print profile processor 80, depending on various preset conditions. If the profiles are appropriately corrected in view of the print mode of the printing machine 18, then a more appropriate color conversion process can be performed.

The flowchart shown in FIG. 7 for producing an appropriate protective-film-covered print 42 with the printing system 10 according to the embodiment has been described above. The process of generating a profile (step S2) will be described in detail below with reference to the flowchart shown in FIG. 8.

The operator confirms whether or not the type of print medium 36 for producing the print 38 has been registered (step S21).

If not registered, then spectral data of the print medium 36 are acquired (step S22). For example, the operator prepares the portable memory 34, which stores the spectral data of the print medium 36, and connects the portable memory 34 to the main unit 24 of the image processing apparatus 16. The spectral data stored in the portable memory 34 then are automatically or manually transferred and stored as new data into the storage unit 76. Alternatively, spectral data of the print medium 36 may be managed by the database DB (see FIG. 1) and, if necessary, acquired from the database DB, whereupon the spectral data are transferred and stored into the storage unit 76. For example, desired spectral data may be read from the database DB, acquired by the data acquirer 65 via the network 12 and the I/F 52, and temporarily stored in the storage unit 76.

Further, alternatively, spectral data of the print medium 36 may be acquired directly from the print medium 36 using the colorimeter 22, which is connected to the main unit 24. A process of directly acquiring spectral data of the print medium 36 using the colorimeter 22 will be described below, mainly with reference to FIG. 3.

The operator enters a request to print the color chart 38c into a setting image, not shown, which is displayed on the display device 26. In response to the request, the image data generator 64 of the main unit 24 generates image data (C, M, Y, K values) for printing the color chart 38c, and supplies the generated image data to the printing machine driver 58. The printing machine driver 58 then converts the image data into print control signals, which are supplied to the printing machine 18, in the same manner as in a case where the electronic manuscript was printed. In response to such print control signals, the printing machine 18 prints the color chart 38c (see FIG. 2).

The C, M, Y, K value data 122 (see FIG. 4), which correspond to pixels of the respective color patches 44, are stored in the storage unit 76 in advance, and read from the storage unit 76 in a case where the image data generator 64 generates image data.

The operator measures spectral data of the color patches 44 of the color chart 38c (see FIG. 2), using the colorimeter 22 connected to the image processing apparatus 16. At this time, the laminating apparatus 20 does not perform a laminating process. It is preferable to determine in advance the sequence in which the color patches 44 are colorimetrically measured, e.g., (01) through (10) on the column (A) and (01) through (10) on the column (B), using the numbers 46 and the alphabetical letters 48 shown in FIG. 2. In a case where the operator has completed the colorimetric measurement, spectral data corresponding to the color patches 44 are saved in the storage unit 76 in relation to the type of print medium 36 via the I/F 72 (see FIG. 3).

After the spectral data have been saved in the storage unit 76, a new type of print medium 36 can be selected from the selection column 144 of the pull-down menu 132, as shown in FIG. 6B. In FIG. 6B, "PVC(A)" where "PVC" refers to polyvinyl chloride" is selected.

In this manner, the type of print medium 36 is established (step S23).

The operator then confirms whether or not the type of laminating film 40 to be applied to the print 38 has been registered (step S24). If not registered, then spectral data of the laminating film 40 are acquired (step S25). Spectral data of the laminating film 40 may be stored in the portable memory 34, and the operator may acquire spectral data of the laminating film 40 from the portable memory 34 or the database DB. Alternatively, spectral data of the laminating film 40, which have been estimated by the optical property value estimator 66, may be acquired.

After the spectral data have been saved in the storage unit 76, a new type of laminating film 40 can be selected from the selection column 148 of the pull-down menu 134, as shown in FIG. 6C. In FIG. 6C, "MATT B" where "MATT" refers to a non-glossy film is selected.

In this manner, the type of laminating film 40 is established (step S26).

The operator then confirms whether or not the type of observational light source DS has been registered (step S27). If not registered, then spectral data of the light source DS are acquired (step S28). Spectral data of the light source DS may be stored in the portable memory 34, and the operator may acquire spectral data of the light source DS from the portable memory 34 or the database DB.

After the spectral data have been saved in the storage unit 76, a new type of light source DS can be selected from the selection column 152 of the pull-down menu 136, as shown in FIG. 6D. In FIG. 6D, a light source "A" is selected.

In this manner, the type of observational light source DS is established (step S29).

Finally, profile generating conditions, including the type of print medium 36 established in step S23, the type of laminating film 40 established in step S26, and the type of light source S established in step S29, are saved (step S30).

After entering a profile name to be generated and registered in the textbox 138 shown in FIG. 6A, the operator presses the button 140 indicating "GENERATE". The setting data 100 are input through the input device 28 to the main unit 24, where the setting data 100 are automatically stored in the storage unit 76.

Thereafter, as shown in FIG. 4, the first spectral data 112, the second spectral data 114, and the third spectral data 116, which are associated with the setting data 100, are selected by the data selector 86 from among the setting data 100 supplied from the storage unit 76, the group 102 of spectral data of the print mediums, the group 104 of spectral data of the laminating films, and the group 106 of spectral data of the observational light sources.

Then, by applying a Kubelka-Munk model, the spectral reflectance predictor 88a of the colorimetric value estimator 88 predicts fourth spectral data 118, i.e., a spectral reflectance of the protective-film-covered print 42, based on the first spectral data 112 and the second spectral data 114.

More specifically, the spectral reflectance of the protective-film-covered print 42 is predicted according to equation (1) shown below. Each of the variables, which are represented by a function at each light wavelength, have been omitted for illustrative purposes.

$$R=[(R_g-R_\infty)/R_\infty-R_\infty(R_g-1/R_{28})\exp\{Sx(1/R_\infty-R_{28})\}]/[(R_g-R_{28})-(R_g-1/R_{28})\exp\{Sx(1/R_\infty-R_{28})\}] \quad (1)$$

where $[R_g]$ indicates the spectral reflectance of the print 38 alone (first spectral data 112), $[R_\infty]$ indicates the inherent spectral reflectance of the laminating film 40, [S] indicates a scattering coefficient per unit thickness of the laminating film 40, and [x] indicates the thickness of the laminating film 40 (see "New Contributions to the Optics of Intensely Light-Scattering Materials, Part I," J. Opt. Soc. Am., Vol. 38, No. 5, pp.-448-457, May 1948).

The Lab calculator 88b calculates colorimetric value data 120 under profile generating conditions based on the third spectral data 116 and the fourth spectral data 118. Under such profile generating conditions, the colorimetric value data 120 refer to L*, a*, b* values, which are estimated based on measured data, in the case that the protective-film-covered print 42 is observed under the light source DS.

More specifically, tristimulus values X, Y, Z of the color patches 44 correspond to values produced by multiplying the spectral radiation distribution of the light source DS, the spectral reflectance of the protective-film-covered print 42, and the color matching function to obtain a product, and then integrating the product within a range of visible light wavelengths. L*, a*, b* values of the color patches 44 are calculated as the colorimetric value data 120 based on the tristimulus values X, Y, Z according to a given equation. According to the present embodiment, since one hundred color patches 44 are measured, one hundred sets of L*, a*, b* values are obtained.

The LUT generator 90 shown in FIG. 4 then generates a color conversion LUT 124 for converting three-dimensional data (L*, a*, b* values) into four-dimensional data (C, M, Y, K values), based on a correspondence relationship between the one hundred sets of colorimetric data (L*, a*, b* values) 120 and the one hundred sets of C, M, Y, K value data 122.

In other words, spectral reflectances corresponding to respective lattice points of a color conversion table are determined based on the spectral reflectance of the protective-film-covered print 42, which has a relatively small number of colors (one hundred colors). The lattice points refer to a number of colorimetric values arranged in a mesh pattern in the L*a*b* space at color difference intervals of Δe=5. Thereafter, the profile (including the LUT 124 as data) of the protective-film-covered print 42 is determined based on the determined spectral reflectances.

With the above arrangement, once spectral data of the print medium 36, the laminating film 40, and the light source DS are acquired, a print profile can be estimated without the need for producing the protective-film-covered print 42 itself. Accordingly, the series of processes for generating a profile is reduced in number, including printing the color chart 38c by the printing machine 18 (including waiting time), the laminating process performed by the laminating apparatus 20, and the colorimetric measurement performed by the colorimeter 22.

For example, if the print medium 36 is available in $N_1$ types, the laminating film 40 in $N_2$ types, and the light source DS in $N_3$ types, then the conventional profile generating method has required ($N_1 \times N_2$) printing and laminating processes, and ($N_1 \times N_2 \times N_3$) colorimetric measurement processes. According to the present invention, the profile generating method requires no laminating processes and requires only $N_1$ printing and colorimetric measurement processes. The profile generating method according to the present invention is more advantageous, since the total number of types $N_1$, $N_2$, $N_3$ is greater.

Print profiles corresponding to profile generating conditions are stored in the storage unit 76, and in a case where a request for printing an electronic manuscript is made, such stored print profiles are selectively read from the storage unit 76. Since a print profile, which has been generated one time, does not need to be generated again, the processing time required for image processing is shortened.

Alternatively, each time that a request is made for printing an electronic manuscript, a print profile corresponding to print setting conditions may be generated and supplied to the color converter 56. In this manner, the amount of data stored in the storage unit 76 can be reduced.

A process of generating a profile (step S2 in FIG. 8) according to the present embodiment has been described above. A process of estimating optical property values of the laminating film 40 will be described in detail below with reference to FIGS. 9A and 9B through 11.

A process of experimentally estimating optical property values of the laminating film 40, which are unknown variables R (inherent reflectance) and Sx (scattering coefficient), will specifically be described below.

Figure 9A:
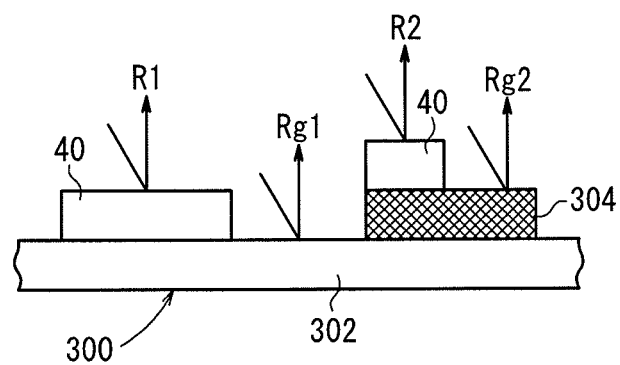
FIGS. 9A and 9B are cross-sectional views showing measurement specimens, which are fabricated in order to estimate optical property values of a protective film.

FIG. 9A is a view showing a measurement specimen 300 fabricated to estimate optical property values of the laminating film 40.

As shown in FIG. 9A, the measurement specimen 300 comprises a base 302, made of a white opaque material having a spectral reflectance (first spectral reflectance) $Rg_1$, a black layer 304, and a laminating film 40, which are to be measured. An unprinted medium 36 is used as the base 302, and a color material, e.g., an ink, of the printing machine 18 is used as the black layer 304. Thus, the measurement specimen 300 can be fabricated, which is simulative of the print 38 (and the protective-film-covered print 42) the print colors of which are to be predicted.

The operator measures spectral reflectances of various regions of the measurement specimen 300 with the colorimeter 22 as the sample data acquirer 75. It is assumed that, as a result of such measurements, the laminating film 40 disposed on the base 302 provides a spectral reflectance (second spectral reflectance) $R_1$, the black layer 304 disposed on the base 302 provides a spectral reflectance (first spectral reflectance) $Rg_2$, and the laminating film 40 disposed on the base 302 with the black layer 304 interposed therebetween provides a spectral reflectance (second spectral reflectance) $R_2$ ($R_1 > R_2$).

The measured values are saved in the storage unit 76 of the main unit 24 of the image processing apparatus 16 via the I/F 72. Thereafter, the measured values are read from the storage unit 76 and supplied to the optical property value estimator 66, which calculates values according to the equations shown below.

Based on a mathematical analysis, an inherent reflectance $R_\infty$ of the laminating film 40 is calculated according to the following equations:

$$R_\infty = \{C - \sqrt{(C^2 - 4)}\}/2 \quad (2)$$

where $$C = \{(R_1 + Rg_2)(R_2 \cdot Rg_1 - 1) - (R_2 + Rg_1)(R_1 \cdot Rg_2 - 1)\} / (R_2 \cdot Rg_1 - R_1 \cdot Rg_2) \quad (3)$$

(see "Special Topic: It's only paper, yet it's paper, and after all, it's paper—Paper properties and their evaluation methods with latest relevant testing standards," Journal of Japan Image Society 150, 2004). If $R_1 < R_2$, then the suffixes "1" and "2" in equation (3) are interchanged.

The inherent reflectance $R_\infty$ represents the spectral reflectance assuming that the measurement specimen 300 is of infinite thickness. If it is possible to superpose a number of laminating films 40 of one type, then the inherent reflectance $R_\infty$ may be measured directly.

Using a measured value $R_n$ (n=1 or 2), a measured value $Rg_n$ (n=1 or 2), and $R_\infty$, which is calculated according to equation (2), the scattering coefficient S and thickness x of the laminating film 40 are calculated according to the following equation:

$$S \cdot x = \ln[\{(R_\infty - Rg_n)(1/R_\infty - R_n)\} / \{(R_\infty - R_n)(1/R_\infty - Rg_n)\}]/(1/R_\infty - R_{28}) \quad (4)$$

(see "Basics and Applied Technologies of Color Representation", page 88, equation (21) (Trikeps)).

In equation (4), S represents a scattering coefficient per unit thickness, and x represents the thickness of the laminating film 40. For illustrative purposes, Sx (=S·x) is defined as a scattering coefficient, i.e., as one variable, at the film thickness x. However, either S or Sx may be used as the scattering coefficient. This also holds true for the absorption coefficient K.

Figure 9B:
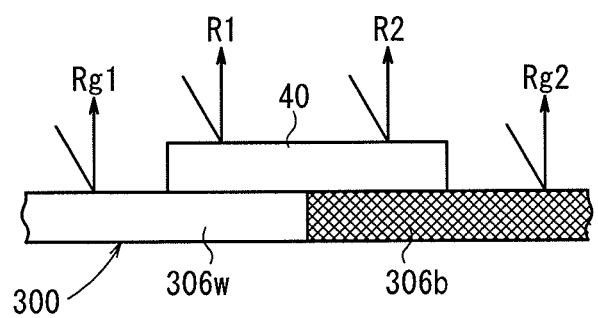

As shown in FIG. 9B, a measurement specimen 300 may include a white base 306b and a black layer 306b, which are juxtaposed, and a laminating film 40 disposed on the white base 306b with the black layer 306b disposed across the boundary thereof. The measurement specimen 300 can easily be fabricated without requiring the laminating apparatus 20 (see FIG. 1).

On the other hand, the measurement specimen 300, which is laminated by the laminating apparatus 20, is close in actual structure to the protective-film-covered print 42, thus making it possible to increase the accuracy with which optical property values of the laminating film 40 are estimated.

Accordingly, it is possible to estimate the optical property values of the laminating film 40, i.e., the inherent reflectance $R_\infty$ and the scattering coefficient Sx, using the measurement specimen 300, which is made up of a combination of two types of sample prints having different densities, e.g., the white base 306w and the black layer 306b, and the laminating film 40.

If a sample print is used, which has a density different from the two types of sample prints (see FIGS. 9A and 9B) described above, then the optical property values possibly may not be directly applicable, due to differences between surface properties or the like. In other words, depending on the combination of the laminating film 40 and the density of the sample print, optical property values thereof may differ from each other, and hence color reproduction accuracy cannot be guaranteed.

It is preferable for measurement specimens 300 to be used, which are combinations of n (n>2) types of sample prints, rather than two types, which are a minimum requirement for estimating optical property values, in order to estimate optical property values of the laminating film 40, i.e., the inherent reflectance $R_\infty$ and the scattering coefficient Sx.

More specifically, measurement specimens (not shown) are fabricated by covering n types of sample prints having different spectral reflectances $Rg_n$ with one type of laminating film 40.

After a spectral reflectance $Rg_n$ (first spectral reflectance) before the sample prints are covered with the laminating film 40, and a spectral reflectance $R_n$ (second spectral reflectance) after the sample prints have been covered with the laminating film 40 are obtained, a nonlinear equation is established, which includes the inherent reflectance $R_\infty$ and the scattering coefficient Sx as two unknown variables. A relational expression (given mathematical model) may be established for each of the types of sample prints. In this case, a total of n simultaneous equations are established in connection with n types of sample prints.

The n simultaneous equations are redundant, because two unknowns exist for the number (n) of the simultaneous equations. The unknowns can be estimated so as to be capable of maximally satisfying the relationship between the equations. The solutions to the simultaneous equations can be found uniquely as described above, but also included within the meaning of the term "solving simultaneous equations," the solutions can be found by estimating optimum unknowns based on a predetermined evaluating function.

For example, if the right side of equation (1) is represented by $KM(Rg_i, R_{28}, Sx)$, then an evaluating function expressed as:

$$Err=\Sigma\{R_i-KM(Rg_i,R_\infty,Sx)\}^2 \quad (5)$$

can be established, and $(R_\infty, Sx)$, which minimize the value of Err according to the equation (5), can be used as estimated values. In the equation (5), $\Sigma$ refers to a summation for i=1, . . . , n.

In order to determine the estimated values $(R_{28}, Sx)$, a known linear optimization process, e.g., a steepest descent method, Newton's method, a quasi-Newton's method, or a simplex method may be used.

By using n types of sample prints where the integral value of n is greater than the degree of freedom (number of unknowns) of the system, it is possible to reduce estimation variations (estimation errors) in the inherent reflectance $R_\infty$ and the scattering coefficient Sx caused by differences between surface properties of the sample prints.

After a measured spectral reflectance $R_n$ is corrected according to a Saunderson correction equation, a Kubelka-Munk model may be applied (see "Calculation of the color of pigmented plastics," J. Opt. Soc. Am., Vol. 32, pp. 727-736, 1942).

More specifically, as indicated by equations (6) and (7) shown below, a spectral reflectance $R_i$, which excludes the effect of light reflection caused by the interface between the laminating film 40 and the external space, can be used instead of a measured spectral reflectance $R_i'$. In equations (6) and (7), $r_1$ represents the spectral reflectance of the interface between the laminating film 40 and the external space with respect to incident light traveling from the external space into the laminating film 40, and $r_2$ represents the spectral reflectance of the interface between the laminating film 40 and the external space with respect to exiting light, which travels from the laminating film 40 into the external space.

$$R_i'=r_1+(1-r_1)(1-r_2)R_i/(1-r_2R_i)=SD(R_i,r_1,r_2) \quad (6)$$

$$R_i=(R_i'-r_1)/\{(1-r_1)(1-r_2)+r_2R_i'-r_1r_2\}=invSD(R_i',r_1,r_2) \quad (7)$$

An evaluating function Err' is expressed according to the following equation (8), which is similar to equation (5):

$$Err'=\Sigma\{invSD(R_i',r_1,r_2)-KM(Rg_i',R_\infty,Sx)\}^2 \quad (8)$$

If the spectral reflectances $r_1$ and $r_2$ are known, then $r_1$ and $r_2$ can be substituted directly into equation (8). If the spectral reflectances $r_1$ and $r_2$ are unknown, then $r_1$ and $r_2$ can be estimated in the same manner as with the other unknowns $(R_\infty, Sx)$. In other words, $(R_{28}, Sx, r_1, r_2)$ can be estimated for minimizing the value of Err' according to equation (8).

Since light reflected at the interface between the laminating film 40 and the external space is further taken into account by the above correction, the spectral reflectance of the protective-film-covered print 42 can be predicted with greater accuracy.

Furthermore, the inherent reflectance $R_\infty$, the scattering coefficient S, and the absorption coefficient K are related to each other by the following equation (9):

$$K/S=(1-R_\infty)^2/2R_{28} \quad (9)$$

Therefore, the absorption coefficient K (or Kx) may be used rather than the inherent reflectance $R_{28}$, and the scattering coefficient S (or Sx), because if any two of these three optical property values are determined, then the other one is capable of being determined uniquely.

Figure 10A:
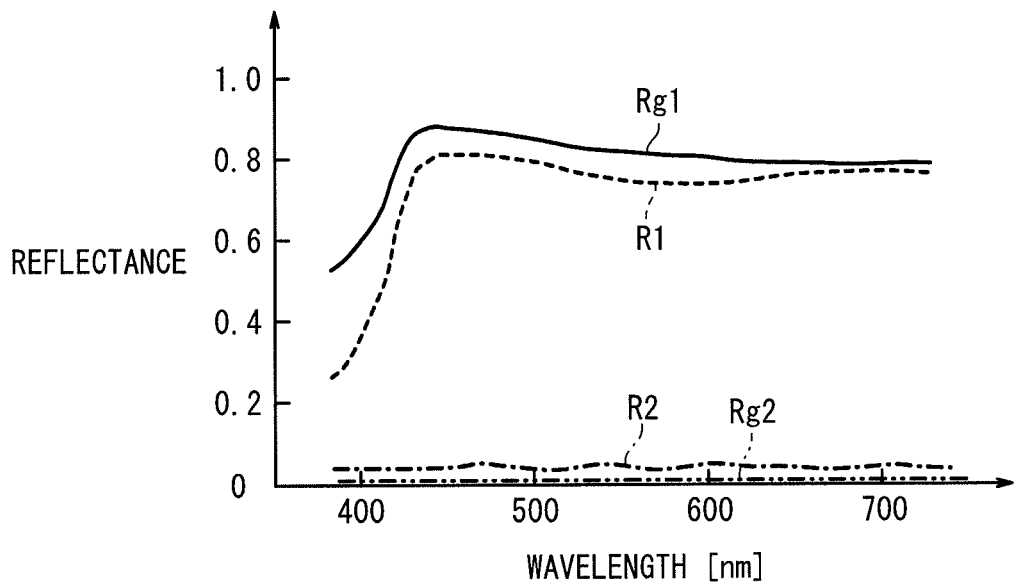
FIGS. 10A and 10B are graphs showing the optical property values of the protective film estimated by an estimating process according to the embodiment.
Figure 10B:
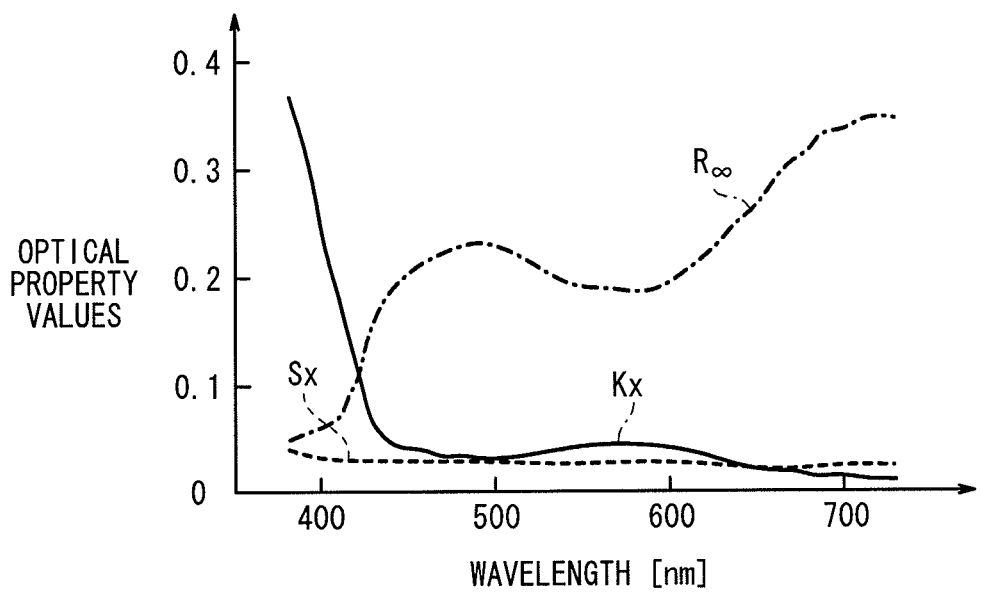

FIGS. 10A and 10B are graphs showing optical property values of the laminating film 40, which are estimated by an estimating process according to the present embodiment. The measurement specimen 300 has the structure shown in FIG. 9A. The laminating film 40 is made of a non-glossy matt material.

The graph shown in FIG. 10A has a horizontal axis representing the light wavelength (unit: nm) and a vertical axis representing measured reflectance values (0 through 1). Spectral reflectances $Rg_i$, $R_1$, $R_2$, $Rg_2$, which are successively lower in value from above, are plotted on the graph.

FIG. 10B shows optical property values estimated according to equations (1) through (5) based on the measurements shown in FIG. 10A. The graph of FIG. 10B has a horizontal axis representing the light wavelength (unit: nm) and a vertical axis representing estimated optical property values. The inherent reflectance $R_{28}$, the absorption coefficient Kx, and the scattering coefficient Sx, which are successively lower in value from above in the vicinity of the light wavelength of 500 nm, are plotted on the graph.

Figure 11:
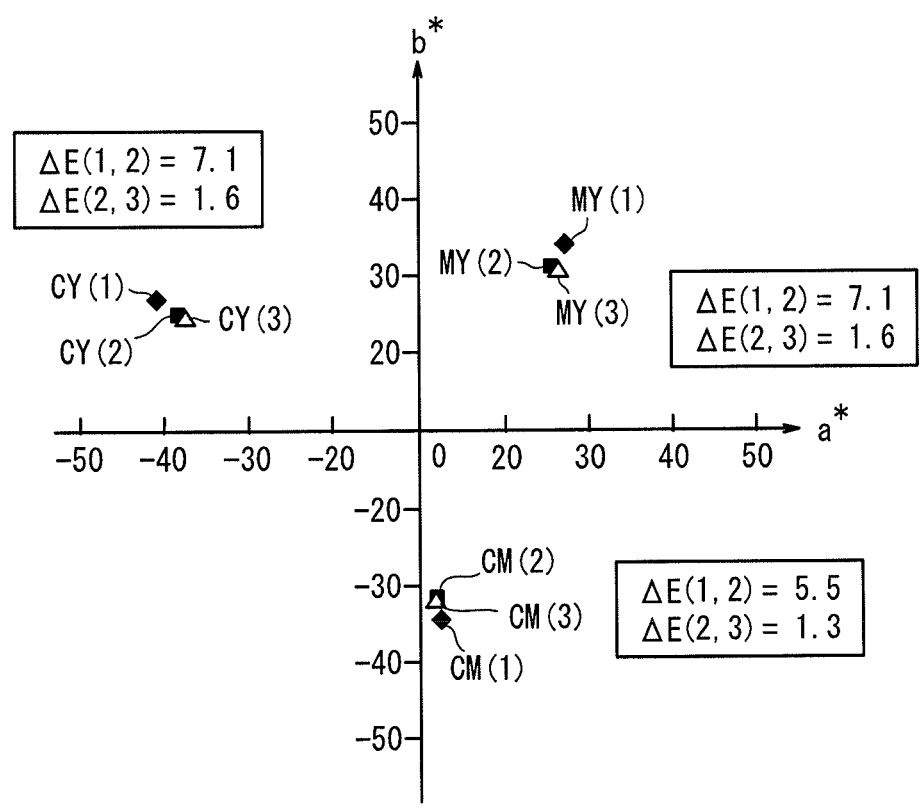
FIG. 11 is a diagram showing a comparison between colorimetric values (predicted values) of a protective-film-covered print, which are obtained based on the estimated optical property values shown in FIG. 10B, and measured colorimetric values of the protective-film-covered print.

FIG. 11 is a diagram showing a comparison between colorimetric values (predicted values) of the protective-film-covered print 42, which are obtained based on the estimated optical property values shown in FIG. 10B, and measured colorimetric values of the protective-film-covered print 42.

The graph of FIG. 11 shows an a*b* space, which is a two-dimensional coordinate system, the horizontal axis of which represents a* and the vertical axis of which represents b* of an L*a*b* space.

A first sample represents a halftone image produced by the printing machine 18 with C, M, Y, K values set to C=0%, M=70%, Y=70%, and K=0%. More specifically, MY(1) represents a plotted measured value of the print 38, MY(2) represents a plotted measured value of the protective-film-covered print 42, and MY(3) represents a plotted predicted value of the protective-film-covered print 42. All of these plotted values reside within the first quadrant of the a*b* space.

A second sample represents a halftone image produced by the printing machine 18 with C, M, Y, K values set to C=70%, M=0%, Y=70%, and K=0%. More specifically, CY(1) represents a plotted measured value of the print 38, CY(2) represents a plotted measured value of the protective-film-covered print 42, and CY(3) represents a plotted predicted value of the protective-film-covered print 42. All of these plotted values reside within the second quadrant of the a*b* space.

A third sample represents a halftone image produced by the printing machine 18 with C, M, Y, K values set to C=70%, M=70%, Y=0%, and K=0%. More specifically, CM(1) represents a plotted measured value of the print 38, CM(2) represents a plotted measured value of the protective-film-covered print 42, and CM(3) represents a plotted predicted value of the protective-film-covered print 42. All of these plotted values reside within the fourth quadrant of the a*b* space.

A comparison between such samples indicates that the color difference between predicted and measured values of the protective-film-covered print 42 is within a range from 1.3 to 1.6. The predicted error can be said to be relatively small compared with color difference variations (in the range from 5.5 to 7.1), depending on whether or not the laminating film 40 is applied.

The predicted colors may be displayed on the display device 26, which is a high-luminance, high-definition monitor, through the simulator 67 (see FIG. 3), for thereby allowing the operator to predict and evaluate how the protective-film-covered print 42 looks, without the need for actually printing the protective-film-covered print 42.

The estimating process according to the present embodiment thus makes it possible to predict print colors of the protective-film-covered print 42 simply and highly accurately.

Optical property values of the laminating film 40 can be estimated based on various mathematical models, which may be linear models, nonlinear models, or other data structures such as lookup tables (LUTs) or the like.

The estimating process for optical property values is not limited to the above process of solving simultaneous equations, but may be a Monte Carlo method, a neural network, a boosting algorithm, a genetic algorithm, or the like.

As indicated by equations (1) through (5), for example, in a Kubelka-Munk model, optical property values such as the inherent reflectance $R_\infty$ and the scattering coefficient Sx are based on the premise that such values are constant, regardless of the spectral reflectance Rg of the print 38.

Figure 12A:
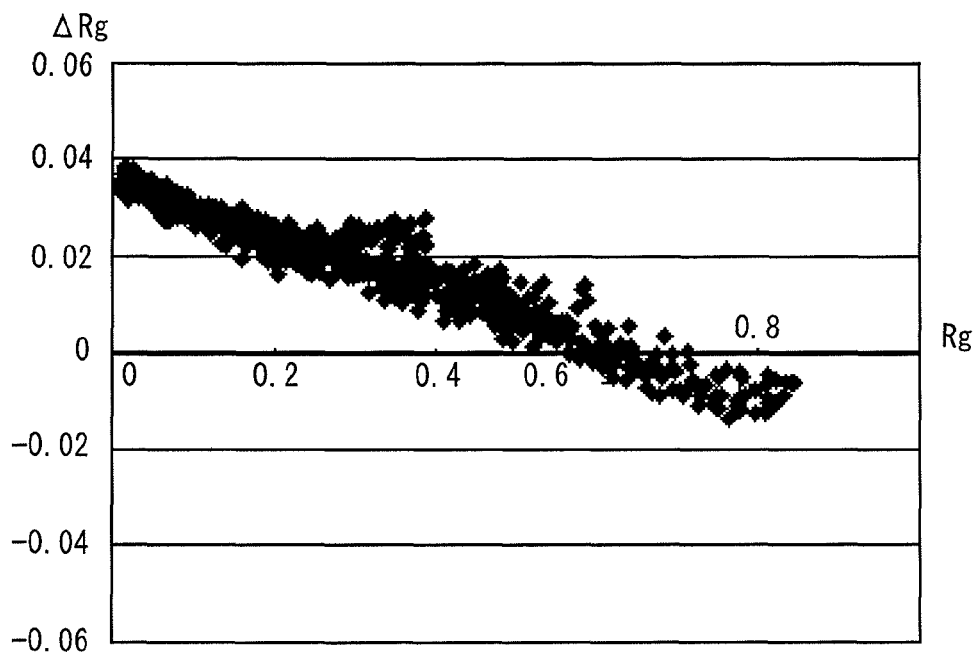
FIGS. 12A and 12B are graphs showing changes in the spectral reflectance of a print before and after the print is covered with a protective film.

FIG. 12A is a typical graph showing changes $\Delta$Rg (=R−Rg) in the spectral reflectance Rg of the print 38 before and after the print is covered with the laminating film 40. The graph of FIG. 12A has a horizontal axis representing the spectral reflectance Rg of the print 38 before the print is covered with the laminating film 40, and a vertical axis representing changes $\Delta$Rg in the spectral reflectance Rg of the print 38 before and after the print is covered with the laminating film 40.

Each plotted point in the graph of FIG. 12A indicates a measured spectral reflectance Rg of one of the color patches 44 on the color chart 38c shown in FIG. 2. The changes $\Delta$Rg are reduced substantially in proportion to the spectral reflectances Rg. Such a tendency agrees with plotted points, which are theoretically obtained by numerical calculations.

Many types of mediums 36 produce measurements that agree with the tendency shown in FIG. 12A, regardless of the light wavelength $\lambda$. However, certain combinations of types of the print medium 36, the laminating film 40, and the light wavelength $\lambda$ may have tendencies that are different from the tendency shown in FIG. 12A. Stated otherwise, although the optical property values of the laminating film 40 ideally are numerical values independent of the printing density of the print 38, the optical property values of the laminating film 40 may undergo changes in a case where the laminating film 40 is applied to the print 38. An example of such changes will be described below.

Figure 12B:
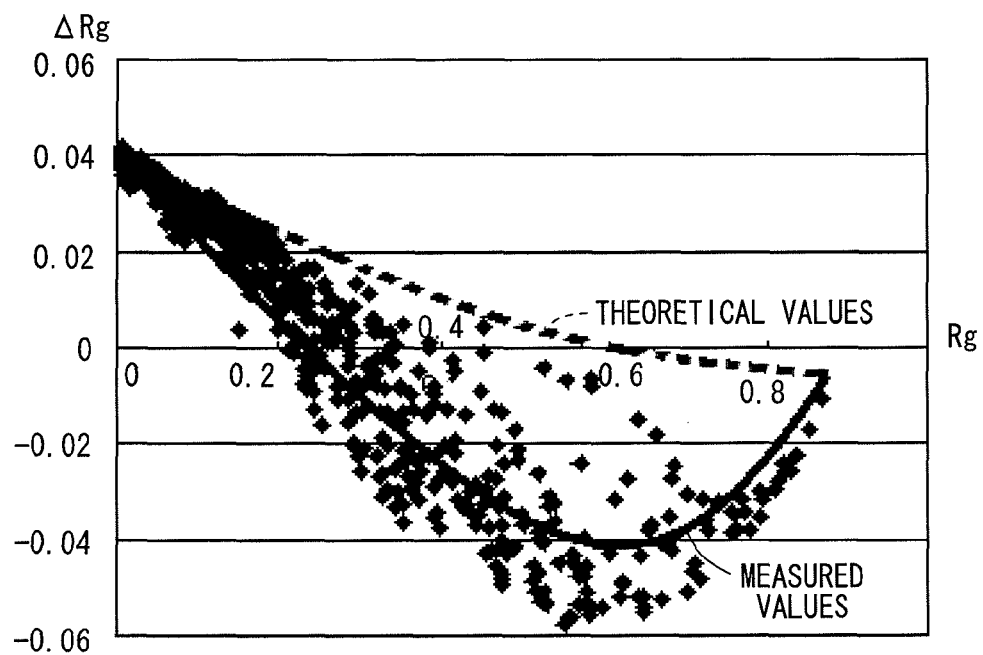

FIG. 12B is a graph, which is defined in the same manner as the graph of FIG. 12A. As shown in FIG. 12B, as the spectral reflectances Rg increase, the changes $\Delta$Rg decrease at a greater rate than in FIG. 12A. In the vicinity of a minimum value Rg=0.6, the changes $\Delta$Rg start to increase as the spectral reflectance Rg increases. The combination of the print medium 36 and the laminating film 40, which is used to produce the measurements, exhibits the tendency shown in FIG. 12B in the vicinity of $\lambda$=40 nm, and at other light wavelengths $\lambda$ (visible light), exhibits a tendency close to the tendency shown in FIG. 12A.

In the vicinity of the minimum value Rg=0.6 (see FIG. 12B), theoretical values of the changes $\Delta$Rg produced by numerical calculations, which are represented by the broken-line curve, and measured values of the changes $\Delta$Rg produced by the actual print 38, which are represented by the solid-line curve, are different from each other. In this case, there is a concern that the difference or error may cause a reduction in the accuracy with which colors are predicted in the vicinity of the spectral reflectance Rg=0.6.

The accuracy with which the spectral reflectance (and hence the print colors) of the protective-film-covered print 42 are predicted can be improved by applying a Kubelka-Munk model to the optical property values (a plurality of sets) of the laminating film 40 depending on the spectral reflectance Rg of the print 38.

In an improved Kubelka-Munk model according to the present invention, the spectral reflectance R of the protective-film-covered print 42 is expressed by the following equation (10), using the spectral reflectance Rg of the print 38 together with the inherent reflectance $R_\infty$ and the scattering coefficient Sx of the laminating film 40:

$$R=KM\{Rg,R_\infty(Rg),Sx(Rg)\} \quad (10)$$

In the improved model, unlike equation (1) described above, the inherent reflectance $R_\infty$ and the scattering coefficient Sx are handled as respective functions of the spectral reflectance Rg. Similar to equation (1), equation (10) is used for each light wavelength $\lambda$.

Figure 13:
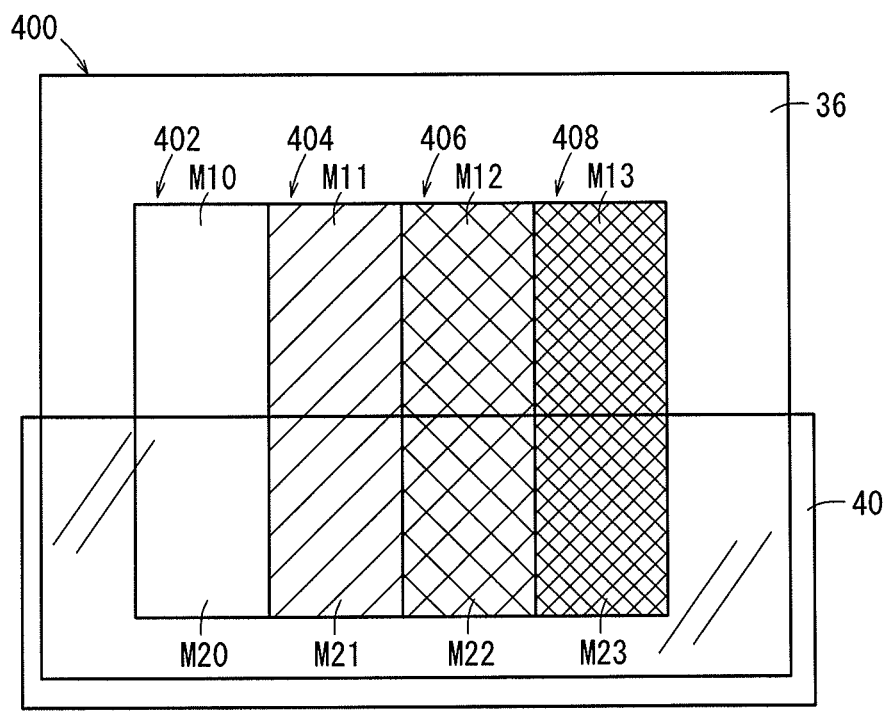
FIG. 13 is a front elevational view of another measurement specimen according to the embodiment.

FIG. 13 is a front elevational view of another measurement specimen 400 according to the present embodiment. As shown in FIG. 13, the measurement specimen 400 includes a print 38 produced by the printing machine 18, which serves to reproduce colors on prints, and a laminating film 40 that covers a portion of the print 38.

The measurement specimen 400 has four types of sample prints produced by a given printing process. More specifically, the measurement specimen 400 is made up of a rectangular unprinted area 402 (sample print), a first area 404

(sample print), which is substantially the same size as the unprinted area 402, a second area 406 (sample print), which is substantially the same size as the unprinted area 402, and a third area 408 (sample print, black sample print), which is substantially the same size as the unprinted area 402, provided on a medium 36. Each of the first area 404, the second area 406, and the third area 408 is filled with a given color. The unprinted area 402, the first area 404, the second area 406, and the third area 408 are colored with colors the densities of which become progressively higher in the order named. In particular, the third area 408 is colored with a color having a maximum density (minimum lightness) or a nearby achromatic color (e.g., $L^* < 10$), which can be printed according to the combination of the printing machine 18 and the print medium 36.

The laminating film 40 is applied to the print medium 36 across lower regions of the unprinted area 402, the first area 404, the second area 406, and the third area 408.

FIG. 14A is a table showing an example of design values for colors of the measurement specimen 400 shown in FIG. 13. Each number in the table represents the halftone dot area ratio in printing (0 to 100%).

In the example shown in FIG. 14A, the first area 404, the second area 406, and the third area 408 are formed by a printing process that uses only one ink of a given color K, i.e., a plurality of types of sample prints in grey colors are produced. The sample prints may be designed such that the areas thereof have a constant saturation level (substantially nil) and respective lightness levels L* arranged at suitable spaced intervals (e.g., equal intervals).

At least one of the color (the value of the halftone dot area ratio in FIG. 14A) and the number of types (the number of rows of the table shown in FIG. 14A) may be changed depending on the type of printing machine 18.

FIG. 14B is a table showing another example of design values for colors of the measurement specimen 400 shown in FIG. 13. In the example shown in FIG. 14B, the first area 404 and the second area 406 are formed by a printing process using the same quantities of inks in respective colors C, M, and Y. The third area 408, which is of the highest density, i.e., which has the lowest spectral reflectance Rg, is formed by a printing process using respective 100%-equivalent amounts (maximum propelled amounts) of inks in the colors C and K.

If the third area 108 is formed using respective 100%-equivalent amounts (i.e., the total amount is equivalent to 300%) of inks in colors C, K, and Y, as with the first area 404 and the second area 406, then the print medium 36 may fail to absorb inks sufficiently, and may possibly cause ink to overflow, with the result that a desired sample print (third area 408) cannot be produced. As a result, the accuracy with which the optical property values of the laminating film 40 are estimated may possibly be impaired in areas where the spectral reflectance R is low.

Such a reduction in accuracy with which the optical property values of the laminating film 40 are estimated can be avoided by selecting colors such that the total amount of inks remains up to a certain level (e.g., 200%). Suitable colors may be selected depending on the type of printing machine 18, regardless of the printing process.

Referring back to FIG. 13, the measurement specimen 400 includes measurement locations M10 through M13 disposed in upper regions, which are not covered with the laminating film 40, of the unprinted area 402, the first area 404, the second area 406, and the third area 408. Spectral reflectances Rg at the respective measurement locations M10 through M13 are denoted respectively by Rg0 through Rg3 (first spectral reflectance).

The measurement specimen 400 also includes measurement locations M20 through M23 disposed in lower regions, which are covered with the laminating film 40, of the unprinted area 402, the first area 404, the second area 406, and the third area 408. Spectral reflectances R at the respective measurement locations M20 through M23 are denoted respectively by R0 through R3 (second spectral reflectance).

The operator then extracts a plurality of types of sample prints from among the four types of sample prints having different spectral reflectances Rg (the unprinted area 402, the first area 404, the second area 406, and the third area 408), to thereby select a plurality of sets of combinations of sample prints (hereinafter referred to as "sample combinations") to be used for estimation in the Kubelka-Munk model. In the present embodiment, the sample combinations are of two types, and three sets of sample combinations, which are used for estimation, are selected from a total number of six possible sets of sample combinations. The sample combinations may be stored in the storage unit 76.

If the measurement specimen 400 has at least three types of sample prints, then a plurality of sets of sample combinations can be selected. The number of types of sample prints that make up the sample combinations is not limited to 2, but may be 3 or more.

In a first example, combinations of sample prints are selected, which include a sample print having a lowest spectral reflectance Rg (the third area 408 in FIG. 13) from among two types of sample combinations, i.e., combinations of the third area 408 and three other types of sample prints. More specifically, combinations of an "A set" (the unprinted area 402 and the third area 408), a "B set" (the first area 404 and the third area 408), and a "C set" (the second area 406 and the third area 408) are selected.

In a second example, sample prints having close spectral reflectances Rg are selected. More specifically, combinations of an "A set" (the unprinted area 402 and the first area 404), a "B set" (the first area 404 and the second area 406), and a "C set" (the second area 406 and the third area 408) are selected.

For each of the selected sample combinations, the optical property values (the inherent reflectance $R_\infty$ and the scattering coefficient Sx) of the laminating film 40 are estimated based on a Kubelka-Munk model (refer to equations (1) through (5)).

It is assumed that the inherent reflectance and the scattering coefficient estimated using the sample combination "A set" are denoted by $R_\infty 0$ and Sx0, respectively, the inherent reflectance and the scattering coefficient estimated using the sample combination "B set" are denoted by $R_\infty 1$ and Sx1, respectively, and the inherent reflectance and the scattering coefficient estimated using the sample combination "C set" are denoted by $R_\infty 2$ and Sx2, respectively.

A process of estimating optical property values of the laminating film 40 depending on any desired spectral reflectance Rg from the estimated optical property values (three sets of discrete values) of the laminating film 40 will be described below with reference to FIGS. 15 and 16.

Figure 15:
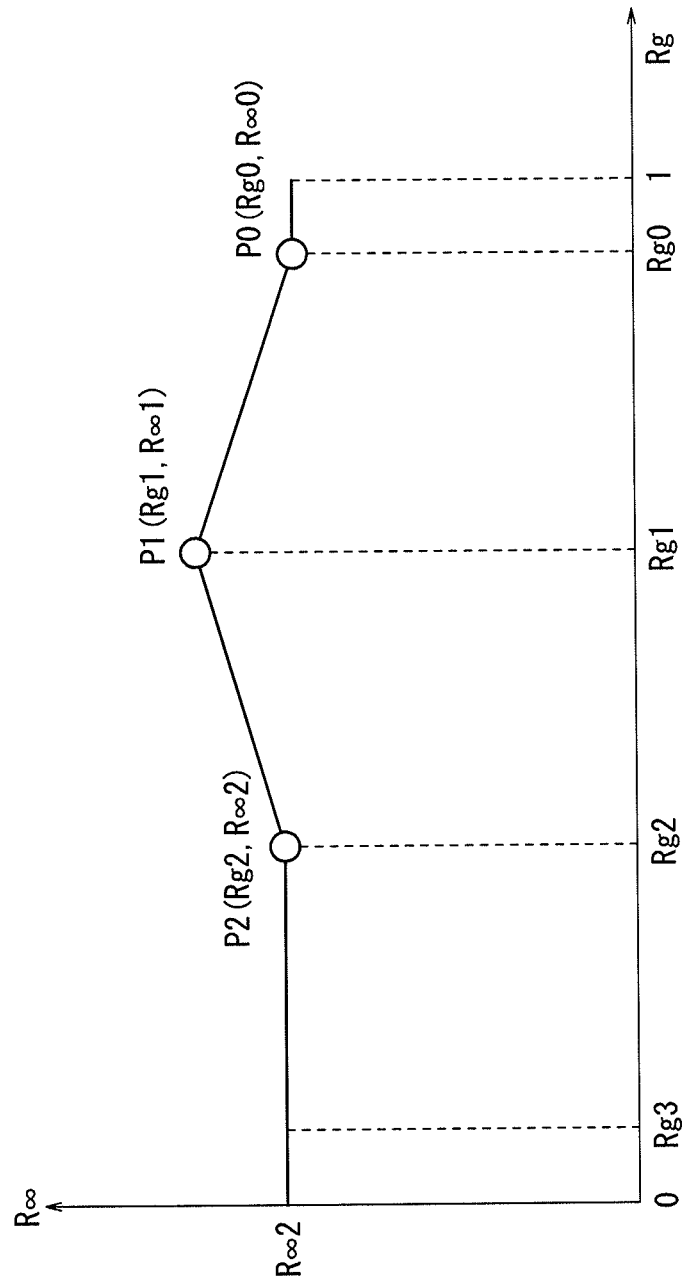
FIG. 15 is a graph showing an estimated example of an inherent reflectance with respect to the spectral reflectance of a print.

FIG. 15 is a graph showing an estimated example of an inherent reflectance $R_\infty$ with respect to the spectral reflectance Rg of the print 38 (sample print). The graph shown in FIG. 15 corresponds to an estimation process, which is suitable for the above first example (i.e., a process for necessarily selecting the first area 408).

In FIG. 15, plotted points P0 through P2 represent respective data estimated based on a Kubelka-Munk model. More specifically, the point P0 refers to a plotted point (Rg0, $R_\infty 0$ estimated using a spectral reflectance Rg0 at the measurement location M10 (see FIG. 13), a spectral reflectance R0 at the measurement location M20, a spectral reflectance Rg3 at the measurement location M13, and a spectral reflectance R3 at the measurement location M23.

The point P1 refers to a plotted point (Rg1, $R_\infty 1$) estimated using a spectral reflectance Rg1 at the measurement location M11, a spectral reflectance R1 at the measurement location M21, the spectral reflectance Rg3, and the spectral reflectance R3.

The point P2 refers to a plotted point (Rg2, $R_\infty 2$) estimated using a spectral reflectance Rg2 at the measurement location M12, a spectral reflectance R2 at the measurement location M22, the spectral reflectance Rg3, and the spectral reflectance R3.

As shown in FIG. 15, between point P0 and point P1 and between point P1 and point P2, an inherent reflectance $R_{28}$, which depends on the spectral reflectance Rg of the print 38 (a function of Rg), is estimated according to a linear interpolation process. Outside of the range from point P0 to point P2, an inherent reflectance $R_\infty$ is extrapolated so as to be equal to the end points P0 and P2. More specifically, if the inequality Rg≥Rg0 is satisfied, then an inherent reflectance $R_\infty$ is estimated as $R_\infty 0$, and if the inequality Rg≤Rg2 is satisfied, then an inherent reflectance $R_\infty$ is estimated as $R_\infty 2$.

Figure 16:
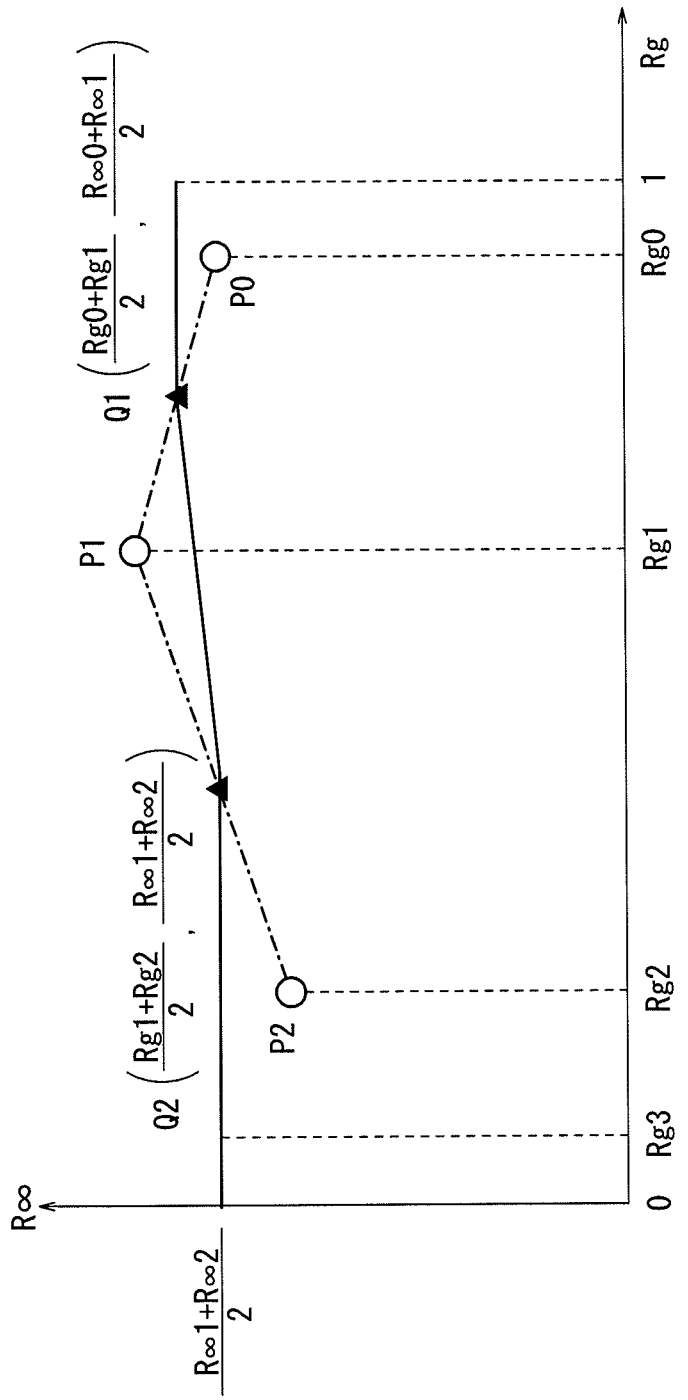
FIG. 16 is a graph showing another estimated example of an inherent reflectance with respect to the spectral reflectance of a print.

FIG. 16 is a graph showing an estimated example of an inherent reflectance $R_\infty$ with respect to the spectral reflectance Rg of the print 38 (sample print). The graph shown in FIG. 16 corresponds to an estimating process suitable for the above second example (i.e., a process for selecting sample prints that are close to each other).

In FIG. 16, plotted points P0 through P2 represent respective data estimated based on a Kubelka-Munk model. More specifically, the point P0 refers to a plotted point (Rg0, $R_\infty 0$) estimated using a spectral reflectance Rg0 at the measurement location M10 (see FIG. 13), a spectral reflectance R0 at the measurement location M20, a spectral reflectance Rg1 at the measurement location M11, and a spectral reflectance R1 at the measurement location M21.

The point P1 refers to a plotted point (Rg1, $R_\infty 1$) estimated using the spectral reflectance Rg1, the spectral reflectance R1, a spectral reflectance Rg2 at the measurement location M12, and a spectral reflectance R2 at the measurement location M22.

The point P2 refers to a plotted point (Rg2, $R_\infty 2$), which is estimated using the spectral reflectance Rg2, the spectral reflectance R2, a spectral reflectance Rg3 at the measurement location M13, and a spectral reflectance R3 at the measurement location M23.

As shown in FIG. 16, a point Q1 forms the midpoint between the point P0 and the point P1, and a point Q2 forms the midpoint between the point P1 and the point P2. Between the point Q1 and the point Q2, an inherent reflectance $R_\infty$ depending on the spectral reflectance Rg of the print 38 (a function of Rg) is estimated according to a linear interpolation process. Outside of a range from the point Q1 to the point Q2, an inherent reflectance $R_\infty$ is extrapolated, so as to be equal to the end points Q1 and Q2. More specifically, if the inequality Rg≥(Rg0+Rg1)/2 is satisfied, then an inherent reflectance $R_\infty$ is extrapolated as a constant value (=$R_\infty 0$), and if the inequality Rg≤(Rg1+Rg2)/2 is satisfied, then an inherent reflectance $R_\infty$ is extrapolated as a constant value (=$R_\infty 2$).

The interpolating and extrapolating processes, which use at least three sets of discrete values, are not limited to the processes (linear interpolation) shown in FIGS. 15 and 16, but may be various known processes, including multidimensional interpolating processes such as a three-dimensional interpolating process. Furthermore, not only interpolating and extrapolating processes, but also approximated curves, such as B-spline curves or Bezier curves, or regression curves using multivariable analyses including a least squares method may be used. In particular, from the standpoint of accuracy, it is preferable to approximate inherent reflectances according to at least a tertiary polynomial.

It is preferable to determine, in advance, the characteristic curve of an inherent reflectance $R_\infty$ with respect to the spectral reflectance Rg according to a given measuring process, and to place the points P0 through P2 at positions that correspond to respective inflection points of the characteristic curve. At least one of the colors (the value of the halftone dot area ratio in FIG. 14A) of the locations M10 through M13 shown in FIG. 13, and the number of measurement locations (the number of rows of the table of FIG. 14A) may be changed depending on the type of print medium 36. Stated otherwise, a measurement specimen 400 may be used in which at least one of the color of the sample prints and the number of types thereof are changed depending on the type of print medium 36. In this manner, the accuracy with which the inherent reflectance $R_\infty$ is estimated can be maintained, even in the vicinity of the inflection points of the characteristic curve.

In other words, the present estimating process is applicable provided that three or more different types of sample prints are on the measurement specimen 400. The color and the number of types of sample prints may be selected in view of the type of print medium 36, the number of steps and the accuracy with which the measurement specimen 400 is measured, and the estimating accuracy of the inherent reflectance $R_\infty$.

The optical property value estimator 66 (see FIG. 3) estimates optical property values of the laminating film 40 for each light wavelength $\lambda(\lambda_1$ through $\lambda_{41}$ in FIG. 4). For example, as shown in FIG. 12A, all of the inherent reflectances $R_\infty 0$ through $R_\infty 2$ are of the same value within a range of light wavelengths $\lambda$ in which theoretical and measured optical property values are in substantial agreement with each other. However, as shown in FIG. 12B, all of the inherent reflectances $R_\infty 0$ through $R_\infty 2$ are of different values within a range of light wavelengths $\lambda$ in which the theoretical and measured optical property values are different from each other.

In FIGS. 15 and 16, processes for estimating an inherent reflectance $R_\infty$ are described. However, the above estimating processes are applicable to other optical property values (e.g., the scattering coefficient Sx (S) and the absorption coefficient Kx (K)). One estimating process may be used for each of the types of optical property values, or respective optimum estimating processes may be used for the types of optical property values.

Figure 17:
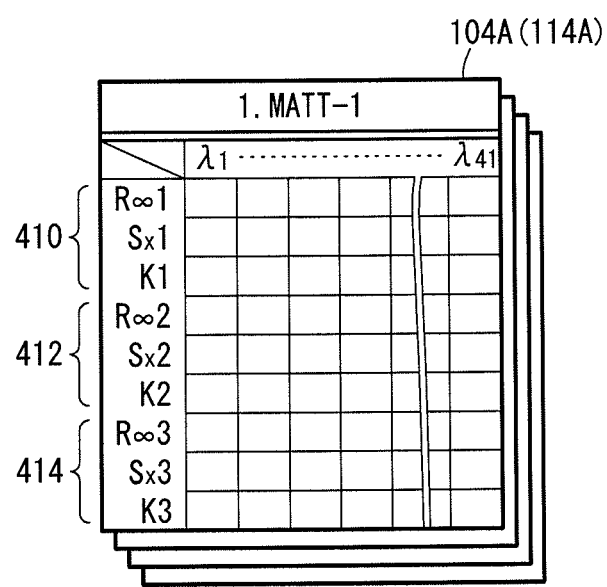
FIG. 17 is a diagram showing another example of configuration of second spectral data shown in FIG. 4.

In a case where the print profile generator 84 (see FIG. 4) generates a print profile, a group 104A of spectral data of laminating films, as shown in FIG. 17, i.e., second spectral data 114A, may be used instead of the group 104 of spectral data of laminating films, i.e., the second spectral data 114.

As shown in FIG. 17, the second spectral data 114A include second spectral data 410 representing values of an inherent reflectance $R_\infty 1$, a scattering coefficient Sx1, and an absorption coefficient K1, depending on the spectral reflectance Rg1 of the print 38 at each light wavelength, second spectral data 412 representing values of an inherent reflectance $R_\infty 2$, a scattering coefficient Sx2, and an absorption coefficient K2, depending on the spectral reflectance Rg2 of the print 38 at each light wavelength, and second spectral data 414 representing values of an inherent reflectance $R_\infty 3$, a scattering coefficient Sx3, and an absorption coefficient K3, depending on the spectral reflectance Rg3 of the print 38 at each light wavelength. The spectral reflectance predictor 88a (see FIG. 5) is thus capable of accurately estimating the spectral reflectance of the protective-film-covered print 42, using the second spectral data 114A depending on the spectral reflectances Rg1 through Rg3.

As described above, a spectral reflectance of the print 38 (first spectral data 112) is acquired, a plurality of sets of optical property values (second spectral data 410, 412, 414) of the laminating film 40 covering the print 38 are estimated depending on the spectral reflectance Rg of the print 38, and the fourth spectral data 118 (spectral reflectance) of the protective-film-covered print 42 are predicted using the first spectral data 112 and the second spectral data 410, 412, 414. Therefore, it is possible to significantly reduce the number of operating steps required to generate a profile, or more specifically, to reduce the number of steps required for printing the color chart 38c, covering the color chart 38c with the laminating film 40, and colorimetrically measuring the color chart 38c covered with the laminating film 40, without lowering the accuracy with which the colors of the protective-film-covered print 42 are reproduced. Furthermore, inasmuch as a plurality of sets of optical property values of the laminating film 40 are used, the accuracy with which the spectral reflectance Rg of the protective-film-covered print 42 is predicted is increased. These advantages are particularly effective in a case where optical property values of the laminating film 40 are changed depending on the spectral reflectance Rg of a certain print 38 combined with the laminating film 40.

The present invention is not limited to the above embodiment. Changes and modifications can be made to the embodiment without departing from the scope of the invention.

In the illustrated embodiment, the color chart 38c has one hundred color patches 44, forty-one spectral data, and light wavelengths spaced at intervals of 10 nm. However, these values can freely be changed in view of the accuracy of color reproduction, the time required to perform the image processing sequence, etc., which are taken into account as a whole.

In the illustrated embodiment, a Kubelka-Munk model is used as a formula for predicting colorimetric values of the protective-film-covered print 42. However, modifications of the Kubelka-Munk model, or other mathematical models, may be used to predict colorimetric values of the protective-film-covered print 42.

In the illustrated embodiment, the printing machine 18 comprises an inkjet printing apparatus. However, the printing machine 18 may comprise an electrophotographic printer, a thermal printer, or any of various other printers.

Although a certain preferred embodiment of the present invention has been shown and described in detail, it should be understood that various changes and modifications may be made to the embodiment without departing from the scope of the invention as set forth in the appended claims.

What is claimed is:

1. A print color predicting apparatus comprising:
a data acquirer for acquiring a spectral reflectance of a print;
an optical property value estimator for estimating wavelength characteristics of optical property values of a protective film covering the print in a plurality of sets, depending on the spectral reflectance of the print, and then estimating a wavelength characteristic of the optical property values of the protective film for each spectral reflectance of the print; and
a spectral reflectance predictor for predicting a spectral reflectance of a protective-film-covered print, using the spectral reflectance of the print, which is acquired by the data acquirer, and the wavelength characteristic of optical property values of the protective film, which is estimated by the optical property value estimator for each spectral reflectance of the print,
wherein the optical property value estimator is configured to perform at least one of 1) an interpolating and extrapolating to determine the estimated wavelength characteristics of the optical property values and 2) an approximation to determine the estimated wavelength characteristics of the optical property values.

2. The print color predicting apparatus according to claim 1, further comprising:
a sample data acquirer for acquiring first spectral reflectances of at least three types of sample prints, and second spectral reflectances of the at least three types of sample prints having the protective film disposed thereon,
wherein the optical property value estimator selects a plurality of sets of combinations of a plurality of types of sample prints from the at least three types of sample prints, and estimates the wavelength characteristic of the optical property values of the protective film from a relationship based on a predetermined mathematical model, using each of the first spectral reflectances and each of the second spectral reflectances acquired by the sample data acquirer, for each of the combinations of the types of sample prints.

3. The print color predicting apparatus according to claim 2, wherein the optical property value estimator estimates the wavelength characteristic of the optical property values of the protective film depending on the spectral reflectance of the print, using each of the first spectral reflectances and the optical property values of the protective film, which are estimated for each of the combinations of the types of sample prints.

4. The print color predicting apparatus according to claim 2, wherein the at least three types of sample prints include a black sample print; and
the sample data acquirer further acquires a first spectral reflectance of the black sample print and a second spectral reflectance of the black sample print having the protective film disposed thereon.

5. The print color predicting apparatus according to claim 4, wherein the optical property value estimator selects a plurality of sets of combinations of at least two types of the sample prints including the black sample print.

6. The print color predicting apparatus according to claim 2, wherein the sample data acquirer acquires the first spectral reflectances and the second spectral reflectances of the sample prints, in which at least one of the color and the number of types of the sample prints has been changed depending on the type of a medium of the print.

7. The print color predicting apparatus according to claim 2, wherein the sample data acquirer acquires the first spectral reflectances and the second spectral reflectances of the sample prints, in which at least one of the color and the number of types of the sample prints has been changed depending on the type of a printing machine for producing the print.

8. The print color predicting apparatus according to claim 2, wherein the relationship based on the predetermined mathematical model is a system of simultaneous equations; and
the optical property value estimator estimates the wavelength characteristic of the optical property values of the protective film by solving the simultaneous equations.

9. The print color predicting apparatus according to claim 2, wherein the predetermined mathematical model is constructed for each of the types of the sample prints.

10. The print color predicting apparatus according to claim 1, further comprising:

a colorimetric value calculator for calculating a colorimetric value of the protective-film-covered print using the spectral reflectance of the protective-film-covered print, which is predicted by the spectral reflectance predictor.

11. The print color predicting apparatus according to claim 10, wherein the data acquirer further acquires a spectral distribution of an observational light source;

the colorimetric value calculator calculates a colorimetric value of the protective-film-covered print further using the spectral distribution of the observational light source, which is acquired by the data acquirer.

12. The print color predicting apparatus according to claim 10, further comprising:

a profile generator for generating a profile based on the colorimetric value of the protective-film-covered print, which is calculated by the colorimetric value calculator.

13. The print color predicting apparatus according to claim 12, further comprising:

a data selector for selecting at least one of the type of a medium of the print, the type of the protective film, and the type of observational light source, wherein the profile generator generates the profile using at least one of the spectral reflectance depending on the type of the medium, which is selected by the data selector, the optical property values depending on the type of the protective film, which is selected by the data selector, and a spectral distribution depending on the type of the observational light source, which is selected by the data selector.

14. The print color predicting apparatus according to claim 1, wherein the data acquirer acquires from a database at least one of the spectral reflectance of the print and a spectral distribution of an observational light source.

15. The print color predicting apparatus according to claim 1, wherein the wavelength characteristic of the optical property values of the protective film comprise wavelength characteristics of two independent optical property values of an inherent reflectance, a scattering coefficient, and an absorption coefficient.

16. A print color predicting method comprising:

acquiring a spectral reflectance of a print;

estimating wavelength characteristics of optical property values of a protective film covering the print in a plurality of sets, depending on the spectral reflectance of the print, and then estimating a wavelength characteristic of the optical property values of the protective film for each spectral reflectance of the print; and predicting a spectral reflectance of a protective-film-covered print, using the spectral reflectance of the print, which is acquired, and the wavelength characteristic of optical property values of the protective film, which is estimated for each spectral reflectance of the print, wherein the optical property value estimating comprises performing least one of 1) an interpolating and extrapolating to determine the estimated wavelength characteristics of the optical property value and 2) an approximation to determine the estimated wavelength characteristics of the optical property value.

17. A non-transitory recording medium storing therein a program to be executed by a computer, the program enabling the computer to function as:

a data acquirer for acquiring a spectral reflectance of a print;

an optical property value estimator for estimating wavelength characteristics of optical property values of a protective film covering the print in a plurality of sets, depending on the spectral reflectance of the print, and then estimating a wavelength characteristic of the optical property values of the protective film for each spectral reflectance of the print; and a spectral reflectance predictor for predicting a spectral reflectance of a protective-film-covered print, using the spectral reflectance of the print, which is acquired by the data acquirer, and the wavelength characteristic of optical property values of the protective film, which is estimated by the optical property value estimator for each spectral reflectance of the print, wherein the optical property value estimator is configured to perform at least one of 1) an interpolating and extrapolating to determine the estimated wavelength characteristics of the optical property values and 2) an approximation to determine the estimated wavelength characteristics of the optical property values.

* * * * *